United States Patent
Yu

(10) Patent No.: US 12,449,935 B2
(45) Date of Patent: Oct. 21, 2025

(54) DISPLAY PANEL AND CONTROL METHOD THEREOF

(71) Applicants: Wuhan Tianma Microelectronics Co., Ltd., Wuhan (CN); Wuhan Tianma Microelectronics Co., Ltd. Shanghai Branch, Shanghai (CN)

(72) Inventor: Shuyang Yu, Wuhan (CN)

(73) Assignees: Wuhan Tianma Microelectronics Co., Ltd., Wuhan (CN); Wuhan Tianma Microelectronics Co., Ltd. Shanghai Branch, Shanghai (CN)

( * ) Notice: Subject to any disclaimer, the term of this patent is extended or adjusted under 35 U.S.C. 154(b) by 56 days.

(21) Appl. No.: 18/636,583

(22) Filed: Apr. 16, 2024

(65) Prior Publication Data
US 2024/0256083 A1    Aug. 1, 2024

(30) Foreign Application Priority Data
Jun. 20, 2023   (CN) .......................... 202310738129.1

(51) Int. Cl.
G06F 3/041   (2006.01)
G06F 3/044   (2006.01)
H10K 59/122  (2023.01)
H10K 59/40   (2023.01)

(52) U.S. Cl.
CPC .......... G06F 3/0418 (2013.01); G06F 3/0412 (2013.01); G06F 3/0443 (2019.05); H10K 59/122 (2023.02); H10K 59/40 (2023.02)

(58) Field of Classification Search
None
See application file for complete search history.

(56) References Cited

U.S. PATENT DOCUMENTS

2016/0357283 A1*  12/2016  Xu .................... G02F 1/133308
2018/0335877 A1*  11/2018  Zhang ................. G06F 3/04164

FOREIGN PATENT DOCUMENTS

| CN | 107092397 A | * | 8/2017 | .......... G06F 3/0414 |
| CN | 108089766 A |   | 5/2018 |                       |
| CN | 111722761 A |   | 9/2020 |                       |

* cited by examiner

Primary Examiner — Duane N Taylor, Jr.
(74) Attorney, Agent, or Firm — KDW Firm PLLC

(57) ABSTRACT

A display panel includes a substrate, a pixel defining layer, a first electrode layer, and a touch function layer. The pixel defining layer is disposed on a side of the substrate and includes multiple pixel openings. The first electrode layer is disposed on the side of the pixel defining layer and includes a common electrode portion and a compensation electrode portion, where the common electrode portion and the compensation electrode portion are insulated from each other, and part of the common electrode portion is disposed in a pixel opening. The touch function layer is disposed on the side of the first electrode layer and includes a touch electrode, where the compensation electrode portion and the touch electrode overlap with each other, and none of the compensation electrode portion and the touch electrode overlaps with the pixel opening.

20 Claims, 13 Drawing Sheets

DISPLAY PANEL AND CONTROL METHOD THEREOF

CROSS-REFERENCE TO RELATED APPLICATION

This application claims priority to Chinese Patent Application No. 202310738129.1 filed Jun. 20, 2023, the disclosure of which is incorporated herein by reference in its entirety.

TECHNICAL FIELD

The present application relates to the field of display technology and, for example, to a display panel and a control method thereof.

BACKGROUND

With the development of display technology, functions of display devices become more and more diversified. A display device generally has a touch function in addition to a display function. According to the positions of touch layers in display panels, touch screens may be classified into out-cell touch screens and in-cell touch screens. The in-cell touch screens are widely used in increasingly thin electronic devices due to their high integration degrees.

At present, most of the touch screens are capacitive touch screens. For an in-cell touch screen, the distance between a touch electrode in a touch layer and a signal line in a display panel configured to control a display state is relatively short, and coupling capacitance is easily generated between a display signal and a touch signal, so crosstalk is caused and the touch precision is reduced.

SUMMARY

The present application provides a display panel and a control method thereof to improve touch precision.

In one aspect, the present application provides a display panel.

The display panel includes a substrate, a pixel defining layer, a first electrode layer, and a touch function layer.

The pixel defining layer is disposed on a side of the substrate and includes multiple pixel openings.

The first electrode layer is disposed on the side of the pixel defining layer facing away from the substrate and includes a common electrode portion and a compensation electrode portion, where the common electrode portion and the compensation electrode portion are insulated from each other, and part of the common electrode portion is disposed in a respective pixel opening.

The touch function layer is disposed on the side of the first electrode layer facing away from the substrate and includes a touch electrode, where the compensation electrode portion and the touch electrode overlap with each other along a direction perpendicular to the plane where the substrate is located, and none of the compensation electrode portion and the touch electrode overlaps with the respective pixel opening.

The common electrode portion is configured to receive a common signal, the compensation electrode portion is configured to receive a compensation signal, and the compensation signal has a non-fixed potential.

In another aspect, based on the same inventive concept, the present application further provides a display panel control method applied to the display panel according to any embodiment of the present application. The control method includes the steps below.

A current touch sensing signal is acquired, and a signal-to-noise ratio is calculated according to the current touch sensing signal.

A current transmission signal of a first display signal line is acquired in response to the signal-to-noise ratio being less than a signal-to-noise ratio threshold.

A current compensation signal is calculated according to the current transmission signal, and the current compensation signal is applied to a compensation electrode portion.

BRIEF DESCRIPTION OF DRAWINGS

To illustrate technical solutions in embodiments of the present application more clearly, the drawings used in the description of the embodiments are briefly described below. Apparently, the drawings described below only illustrate part of the embodiments of the present application, and those of ordinary skill in the art may obtain other drawings based on the drawings described below on the premise that no creative work is done.

DETAILED DESCRIPTION

Figure 1:
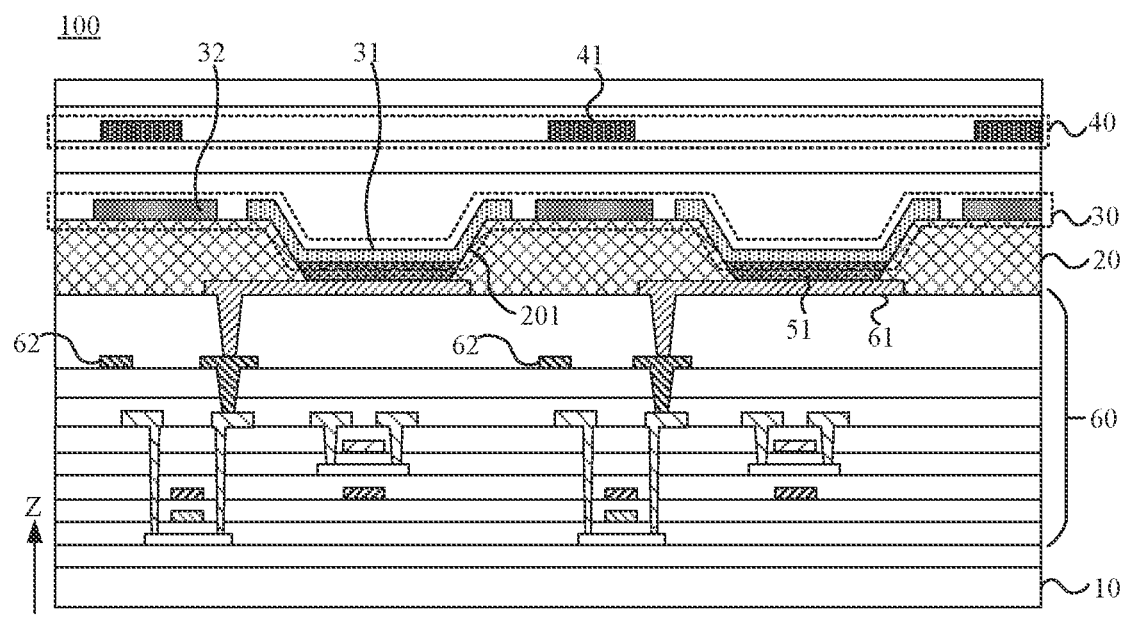
FIG. 1 is a sectional view of a display panel according to an embodiment of the present application.

To make the solutions of the present application better understood by those skilled in the art, the technical solutions in embodiments of the present application are described below clearly and completely in conjunction with drawings in the embodiments of the present application. Apparently, the embodiments described below are part, not all, of the embodiments of the present application. Based on the embodiments of the present application, all other embodiments obtained by those of ordinary skill in the art on the premise that no creative work is done are within the scope of the present application.

It is apparent for those skilled in the art that various modifications and variations in the present application can be made without departing from the spirit or scope of the present application. Therefore, the present application is intended to cover modifications and varies of the present application which fall within the scope of the corresponding claims (the claimed technical solutions) and their equivalents. It is to be noted that implementations provided in the embodiments of the present application may be combined with each other if there is no contradiction.

First, it is to be noted that, unless otherwise defined, technical terms or scientific terms used in the present application shall have general meanings understood by those with general skills in the field to which the present application belongs. The terms "first", "second", and the like in the present application are used for distinguishing between different components but not used for describing any order, quantity, or significance. The term "including", "comprising", or the like means that elements or objects in front of the term cover elements or objects and their equivalents listed behind the term, but does not exclude other elements or objects. The term "connected", "connected to each other", or the like is not limited to physical or mechanical connections, but may include electrical connections, whether it is direct or indirect. "Up", "down", "left", "right", and the like are merely used for indicating a relative positional relationship, and when the absolute position of a described object is changed, the relative positional relationship may also change accordingly. In addition, the shape and size of each component in the drawings do not reflect the real scale, and the purpose is only to illustrate the content of the present application.

FIG. 1 is a sectional view of a display panel according to an embodiment of the present application. As shown in FIG. 1, a display panel 100 according to the embodiment of the present application includes a substrate 10, a pixel defining layer 20, a first electrode layer 30, and a touch function layer 40. The pixel defining layer 20 is disposed on a side of the substrate 10 and includes multiple pixel openings 201. The first electrode layer 30 is disposed on one side of the pixel defining layer 20 facing away from the substrate 10 and includes common electrode portions 31 and compensation electrode portions 32. The common electrode portions 31 are insulated from the compensation electrode portions 32. Part of a common electrode portion 31 is disposed in a pixel opening 201. The touch function layer 40 is disposed on one side of the first electrode layer 30 facing away from the substrate 10 and includes touch electrodes 41. one of the compensation electrode portions 32 overlaps with a respective touch electrode 41 along a direction Z perpendicular to the plane where the substrate is located, and none of the compensation electrode portion 32 and the touch electrode 41 overlaps with the pixel opening 201. The common electrode portions 31 are configured to receive a common signal, the compensation electrode portions 32 are configured to receive a compensation signal, and the compensation signal has a non-fixed potential.

In an embodiment, the display panel is an organic light-emitting diode (OLED) display panel, and the touch function layer 40 is built in the display panel 100 and the display panel 100 has a touch function.

As shown in FIG. 1, a light-emitting device 51 is formed in the corresponding pixel opening 201, and two adjacent light-emitting devices 51 are isolated by the pixel defining layer 20 between the two adjacent light-emitting devices 51, thereby preventing optical crosstalk. A display driving layer 60 is disposed between the pixel defining layer 20 and the substrate 10. The display driving layer 60 includes structures, such as circuits and signal lines, and is configured to drive the light-emitting devices 51 to emit light.

It is to be noted that FIG. 1 illustrates an example in which the light-emitting device 51 is completely disposed in the pixel opening 201. In another embodiment, part of a light-emitting device 51 may be disposed in the pixel opening 201. Optionally, at least part of the light-emitting device 51 is disposed in the pixel opening 201. Specifically, the light-emitting device 51 may be an OLED and includes a p-type semiconductor layer, a light-emitting layer, and an n-type semiconductor layer which are stacked in sequence along the Z direction shown in the figure. The light-emitting layer is disposed between the p-type semiconductor layer and the n-type semiconductor layer. The emitted color of the light-emitting device is determined by the material of the light-emitting layer, and at least the light-emitting layer is disposed in the pixel opening 201. Alternatively, part of the light-emitting layer may extend beyond the pixel opening 201 due to the limitation of a process condition, as long as it is ensured that light-emitting layers of light-emitting devices with different emitted colors do not communicate with each other.

In an embodiment, the first electrode layer 30 is disposed on the side of the pixel defining layer 20 facing away from the substrate 10 and includes a common electrode portion 31 and a compensation electrode portion 32 which are insulated from each other. As shown in FIG. 1, part of the common electrode portion 31 is disposed in the pixel opening 201 and configured to be electrically connected to the n-electrode (the n-type semiconductor layer) of the light-emitting device 51. Thus, in a display stage, the common signal received by the common electrode portion 31 may be transmitted to the light-emitting device, and at the same time, a pixel driving circuit in the display driving layer 60 may transmit an anode signal to the p-electrode (the p-type semiconductor layer) of the light-emitting device through an anode electrode 61 to drive the light-emitting device to emit light. With continued reference to FIG. 1, the compensation electrode portion 32 overlaps with the touch electrode 41 in the touch function layer 40, none of the compensation electrode portion 32 and the touch electrode 41 overlaps with the pixel opening 201, and the compensation electrode portion 32 is configured to receive the compensation signal having the non-fixed potential, that is, the voltage of the compensation signal varies. With this configuration, since display signals transmitted by part of the signal lines in the display driving layer 60 are varying signals, varying compensation signals are applied to the compensation electrode portions 32 so that the interference to touch signals can be compensated/reduced, thereby improving touch precision.

In an embodiment, a cathode layer in the related art may also serve as the first electrode layer 30. The cathode layer in the related art is typically an entire film covering the pixel defining layer 20 and light-emitting devices 51 in the pixel openings 201, so as to be electrically connected to the light-emitting devices and transmit common signals (such as PVEE signals) to the light-emitting devices at the same time. However, in this embodiment, the cathode layer is divided into the common electrode portions 31 and the compensation electrode portions 32. Thus, the common electrode portions 31 can be configured to receive the common signals to transmit the common signals to the light-emitting devices 51, ensuring a normal display function. In addition, the compensation electrode portions 32 can be configured to receive the compensation signals having non-fixed potentials so that the interference to the touch signals caused by the varying display signals transmitted by the signal lines in the display driving layer 60 is reduced, thereby improving the touch precision.

It is to be noted that the structure of the touch function layer 40 shown in FIG. 1 is only illustrative and is not limiting. A manner in which the touch electrode 41 is configured in the touch function layer 40 is not limited in the embodiment of the present application specifically. Those skilled in the art may configure the touch electrode according to an actual touch mode (a self-capacitive touch/a mutual capacitive touch). It is to be understood that to avoid affecting a display effect, the top-view shape of touch electrodes is typically the shape of a grid, where grid lines constituting the touch electrode do not overlap with the light-emitting device, and a grid opening corresponds to the region in which the light-emitting device is disposed, so as to avoid blocking light.

It is also to be noted that in order that it is convenient to distinguish between the common electrode portions 31 and the compensation electrode portions 32, the common electrode portions 31 and the compensation electrode portions 32 are represented in FIG. 1 in different patterns (hereinafter the same). In an actual product, the common electrode portions 31 and the compensation electrode portions 32 are disposed in the same film (that is, the first electrode layer 30).

It is also to be noted that since the touch electrode 41 is mainly disposed in the display region, in this embodiment, the common electrode portions 31 and the compensation electrode portions 32 are mainly referred to as part of the first electrode layer 30 disposed in the display region. The first electrode layer 30 may further include at least two wires disposed in a non-display region which are configured to transmit the common signals of a driver chip to the common electrode portions 31 and the compensation signals to the compensation electrode portions 32 separately, which is illustrated exemplarily hereinafter in conjunction with the drawings.

In summary, in the display panel according to the embodiment of the present application, the first electrode layer is disposed on the side of the pixel defining layer facing away from the substrate, and the first electrode layer is configured to include the common electrode portions and the compensation electrode portions which are insulated from the compensation electrode portions, where part of the common electrode portion is disposed in the pixel opening, the compensation electrode portion overlaps with the touch electrode in the touch function layer, none of the compensation electrode portion and the touch electrode overlaps with the pixel opening, the common electrode portion receives the common signal, and the compensation electrode portion receives the compensation signal having the non-fixed potential. Thus, the common electrode portion may be configured to transmit the common signal to the light-emitting device so that the normal display function is ensured. In addition, the varying compensation signal on the compensation electrode portion may be used for reducing the interference to a touch signal caused by a varying display signal in the display driving layer, thereby improving the touch precision.

Based on the preceding embodiment, as shown in FIG. 1, in an embodiment, the display driving layer 60 includes first display signal lines 62 configured to transmit first display signals, and the compensation electrode portion 32 further overlaps with a first display signal line 62 along the direction Z perpendicular to the plane where the substrate is located, where the compensation signal is determined according to a first display signal.

The first display signal has a non-fixed potential, that is, the voltage of the first display signal varies. Since the first display signal has the non-fixed potential, if the first display signal line transmitting the first display signal overlaps with the touch electrode, inductive capacitance of a touch sensor is easily caused to vary when the first display signal varies, so a noise point is generated and the touch precision is reduced. In this embodiment, the compensation electrode portion 32 is configured to overlap with the first display signal line 62 and the touch electrode 41, the compensation signal having the non-fixed potential is applied to the compensation electrode portion 32, and the compensation signal is determined according to the first display signal. In this manner, each of a voltage variation on the compensation electrode portion 32 and a voltage variation on the first display signal line 62 causes the inductive capacitance of the touch sensor to vary so that the compensation signal applied to a compensation electrode can be used for reducing or even cancelling out the variation of the inductive capacitance of the touch sensor caused by the voltage variation of the first display signal line. Thus, the object to reduce a noise is achieved and the touch precision is improved.

Further, in an embodiment, a voltage variation amount of the compensation signal is proportional to the opposite number of a voltage variation amount of the first display signal.

It is to be noted that each of the voltage variation amount of the compensation signal and the voltage variation amount of the first display signal is a vector. The voltage variation amount of the preceding compensation signal is proportional to the opposite number of the voltage variation amount of the first display signal. In other words, the voltage variation direction of the compensation signal is opposite to the voltage variation direction of the first display signal, and the absolute value of the voltage variation amount of the compensation signal is proportional to the absolute value of the voltage variation amount of the first display signal.

Figure 2:
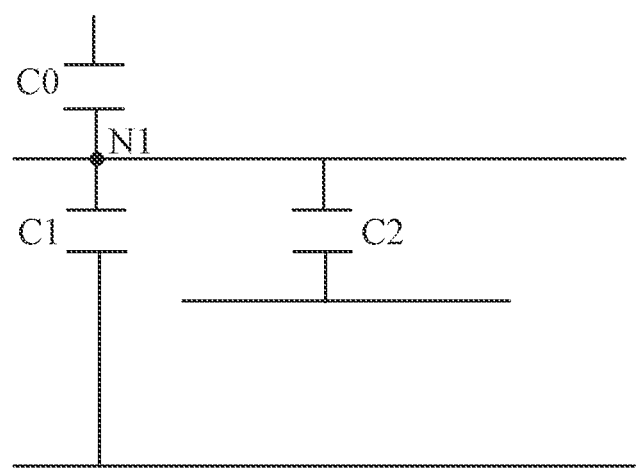
FIG. 2 is a schematic diagram showing a noise reduction principle of a display panel according to an embodiment of the present application.

For example, FIG. 2 is a schematic diagram showing a noise reduction principle of the display panel according to the embodiment of the present application. In FIG. 2, an N1 node denotes the position where the first display signal line 62 overlaps with the touch electrode 41 and denotes the position where the compensation electrode portion 32 overlaps with the touch electrode 41, C0 denotes the capacitance on a touch sensor (a touch panel (TP) sensor) after a touch driving signal is applied to the touch electrode, C1 denotes the coupling capacitance of the overlapping region between the first display signal line 62 and the touch sensor, and C2 denotes the coupling capacitance of the overlapping region between the compensation electrode portion 32 and the touch sensor. In the related art, when the voltage of the first display signal on the first display signal line varies, the voltage of the N1 node also varies and the inductive capacitance on the touch sensor varies due to a coupling voltage, so the noise point is generated. To solve this problem, in the embodiment of the present application, the compensation electrode portions 32 are disposed between the film in which the first display signal lines 62 are disposed and the film in which the touch electrodes 41 are disposed so that each of the first display signal line 62 and the touch electrode 41 overlaps with the compensation electrode portion 32, and the voltage variation amount of the compensation signal is set to be proportional to the opposite number of the voltage variation amount of the first display signal so that the interference to the touch signal caused by the voltage variation of the first display signal on the first display signal line can be effectively reduced, thereby improving the touch precision. The derivation process of the conclusion is explained in detail below.

As described above, if the voltage of the first display signal on the first display signal line varies, the voltage of the N1 node is caused to vary, and the inductive capacitance on the touch sensor varies, so the noise point is generated. Similarly, in this embodiment, the compensation electrode portions 32 are disposed between the film in which the first display signal lines 62 are disposed and the film in which the touch electrodes 41 are disposed, and each of the first display signal line 62 and the touch electrode 41 overlaps with the compensation electrode portion 32. Thus, if the voltage of the compensation signal on the compensation electrode portion 32 varies, the voltage of the N1 node is caused to vary. Therefore, if voltage variation amounts of the N1 node caused by the voltage variations of the two (the first display signal line and the compensation electrode portion) cancel out each other, a variation amount of the inductive capacitance caused by the voltage variation of the compensation signal on the compensation electrode portion 32 can be used for reducing or cancelling out a variation amount of the inductive capacitance caused by the voltage variation of the first display signal on the first display signal line 62. Thus, the noise can be reduced, and the touch precision is improved.

When the voltage of the first display signal on the first display signal line 62 varies by $\Delta U1$, a voltage variation amount of the N1 node is $\Delta UN1$, and $\Delta UN1 = C1 \ast \Delta U1/(C1+C0)$. Assuming that the voltage of the compensation signal on the compensation electrode portion 32 varies by $\Delta U2$ and the voltage variation amount of the N1 node is caused to be $\Delta UN1'$, and it can be obtained, according to the preceding explanation, that $\Delta UN1' = -\Delta UN1$.

Further, it can be obtained that $$\frac{C2 \cdot \Delta U2}{C2 + C0} = -\frac{C1 \cdot \Delta U1}{C1 + C0}.$$

Therefore, it can be obtained that $$\Delta U2 = -\frac{C1 \cdot (C2 + C0)}{C2 \cdot (C1 + C0)} \Delta U1 = -K \Delta U1.$$

Thus, it can be concluded that the voltage variation amount ($\Delta U2$) of the compensation signal is proportional to the opposite number of the voltage variation amount ($\Delta U1$) of the first display signal, where a proportionality constant K (a positive number) may be determined according to C0, C1, and C2, and C0, C1, and C2 may be determined at the time of simulation.

In summary, in this embodiment, the voltage variation amount of the compensation signal is set to be proportional to the opposite number of the voltage variation amount of the first display signal, and the variation amount of the inductive capacitance caused by the voltage variation of the compensation signal on the compensation electrode portion can be used for reducing or cancelling out the variation amount of the inductive capacitance caused by the voltage variation of the first display signal on the first display signal line so that the interference to the touch signal caused by the voltage variation of the first display signal on the first display signal line can be effectively reduced, thereby improving the touch precision.

For example, the display driving layer 60 includes display signal lines such as scan signal lines, data signal lines, and power signal lines (such as a PVDD signal line and a PVEE signal line). Scan signals transmitted by the scan signal lines and data signals transmitted by the data signal lines all have non-fixed potentials. In addition, the voltage of a scan signal varies greatly (for example, amplitude hops between +6 V), and the voltage of a data signal varies rapidly (since each pixel has different brightness, the voltage on a data signal line varies continuously in a scan process), so each of a scan signal line and a data signal line easily causes the interference to the touch signal. Therefore, the first display signal line 62 may include at least one of the scan signal line and the data signal line, and accordingly, the first display signal is at least one of the scan signal and the data signal.

Figure 3:
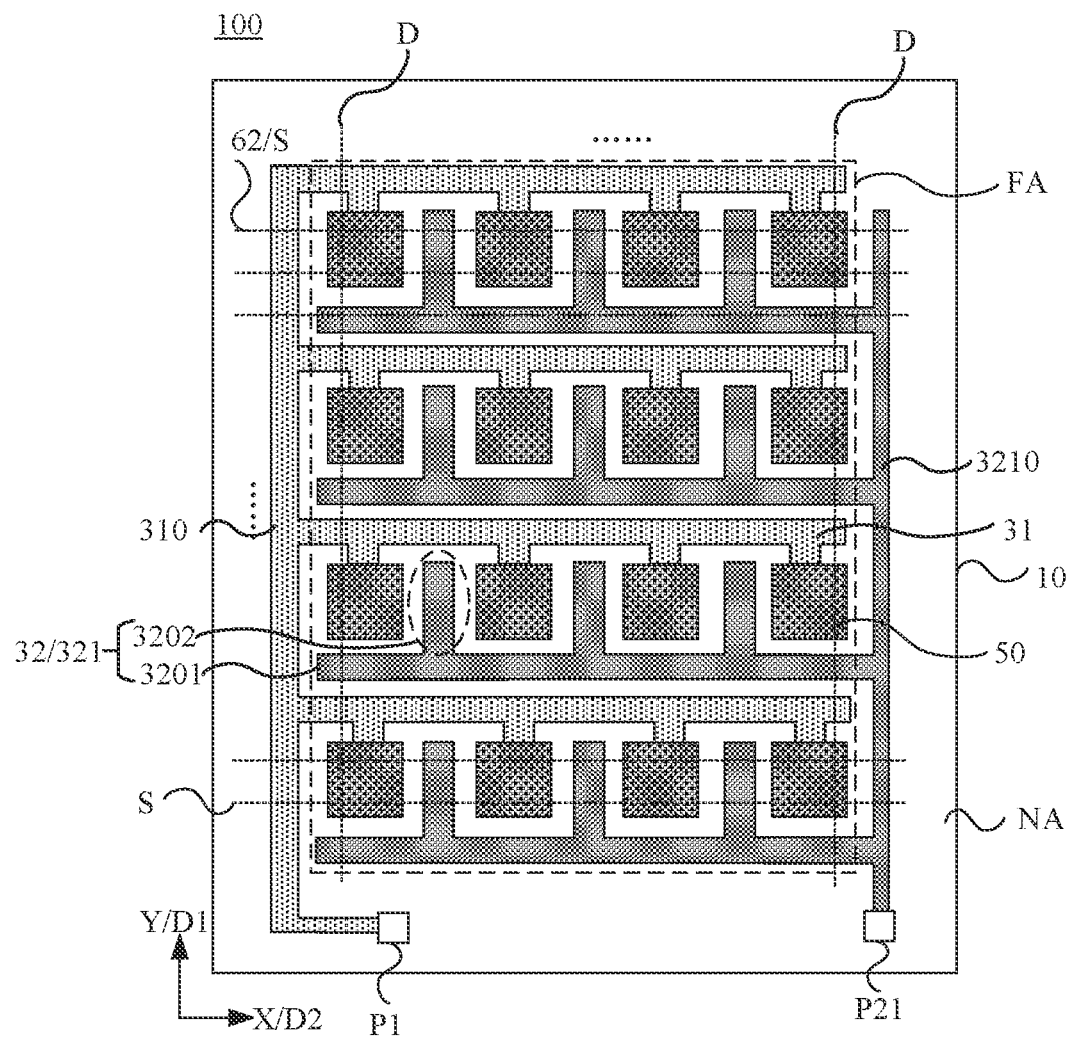
FIG. 3 is a top view illustrating a structure of a display panel according to an embodiment of the present application.

As a possible embodiment, FIG. 3 is a top view illustrating a structure of a display panel according to an embodiment of the present application, and as shown in FIG. 3, optionally, the compensation electrode portion 32 includes at least one first compensation electrode portion 321, the first display signal lines 62 include scan signal lines S configured to transmit the scan signals, and the first compensation electrode portion 321 overlaps with the scan signal lines S along the direction perpendicular to the plane where the substrate 10 is located. In this case, the first compensation electrode portion 321 may be configured to receive a first compensation signal, and the first compensation signal may be determined according to the scan signal.

The first compensation signal is determined according to the scan signal, and specifically, the voltage variation amount of the first compensation signal may be proportional to the opposite number of a voltage variation amount of the scan signal. In the case where the scan signal generates a relatively large noise, the first compensation signal on the first compensation electrode portion 321 may be adjusted adaptively according to the voltage variation amount of the scan signal so that the voltage variation amount of the first compensation signal is proportional to the opposite number of the voltage variation amount of the scan signal. With this configuration, the first compensation electrode portion 321 can be configured to reduce the interference to the touch signal caused by the scan signal lines S overlapping with the first compensation electrode portion 321, thereby improving the touch precision.

Figure 4:
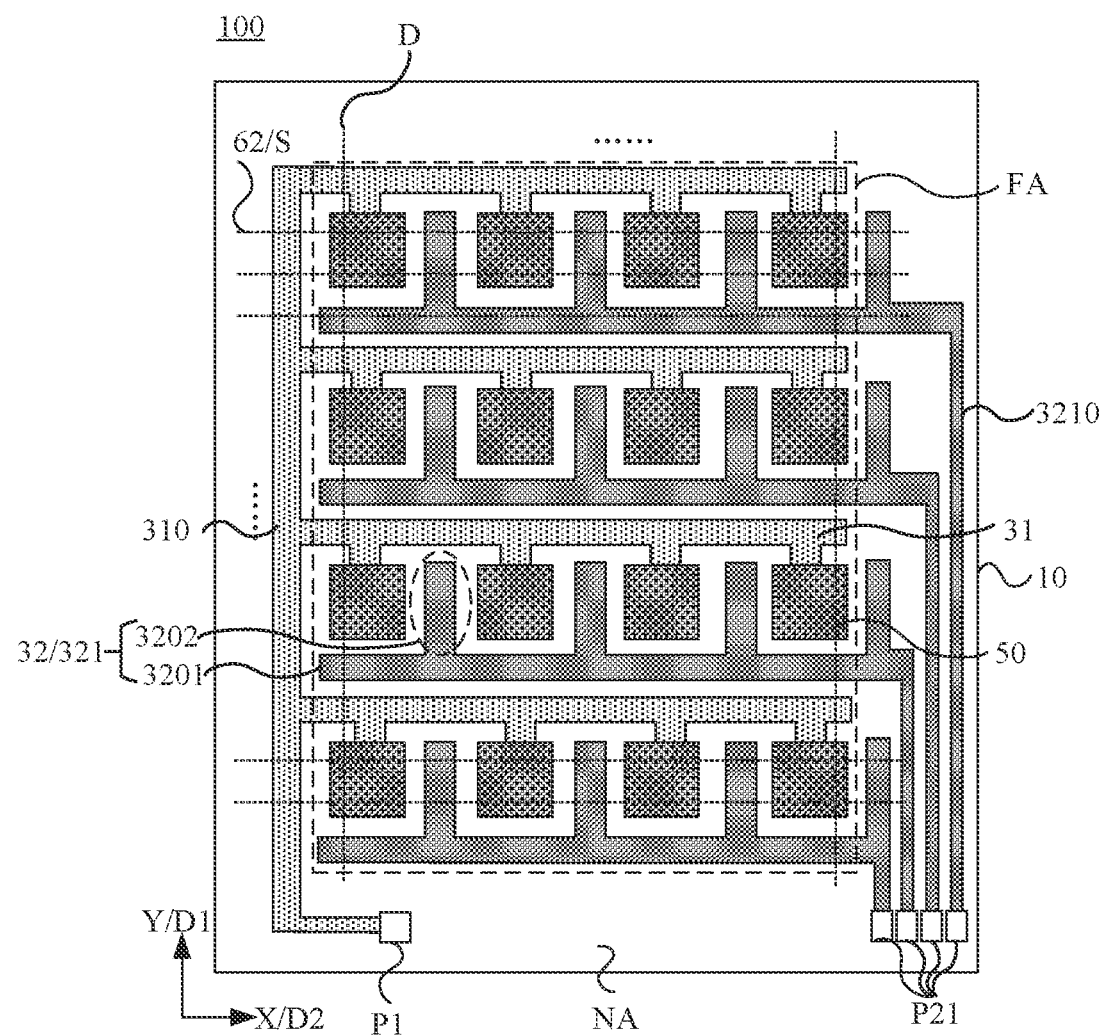
FIG. 4 is a top view illustrating a structure of another display panel according to an embodiment of the present application.

It is to be noted that FIG. 3 illustrates only an example in which the compensation electrode portion 32 includes multiple first compensation electrode portions 321 disposed side by side and the multiple first compensation electrode portions 321 are electrically connected through a first compensation signal line 3210 in a non-display region NA. In this case, all the first compensation electrode portions 321 have the same voltage variation, and a control manner is simpler. For example, as shown in FIG. 3, the driver chip may transmit the first compensation signal to each of the first compensation electrode portions 321 through a first compensation pad P21 and the first compensation signal line 3210. This configuration manner is not limiting. In other embodiments, when the compensation electrode portion 32 includes the multiple first compensation electrode portions 321, all the first compensation electrode portions 321 may be electrically connected to different first compensation pads P21 through different first compensation signal lines 3210, as shown in FIG. 4 which is a top view illustrating a structure of another display panel according to an embodiment of the present application. In this case, each of the first compensation electrode portions 321 overlaps with different scan signal lines S and the first compensation signal can be independently applied to the first compensation electrode portions 321. Therefore, the variation of the first compensation signal on each of the first compensation electrode portions 321 can be adjusted adaptively according to the interference, caused by scan signals on the scan signal lines S at different positions, to a touch signal of a touch sensor overlapping with the scan signal lines S, thereby further improving the touch precision.

Further, in other embodiments, the compensation electrode portion 32 may include one first compensation electrode 321, which is illustrated exemplarily hereinafter.

It is to be noted that FIGS. 3 and 4 illustrate only an example in which the first compensation electrode portion 321 and the first compensation signal line 3210 are disposed in the same layer, and in other embodiments, the first compensation electrode portion 321 and the first compensation signal line 3210 may be disposed in different layers and are electrically connected through punched holes, which is not limited in the embodiment of the present application.

It is also to be noted that FIG. 3 illustrates only an example in which the extension direction of the long side of the first compensation electrode portion 321 in a display region FA is the same as the extension direction of the scan signal line S and the multiple first compensation electrode portions 321 are disposed side by side along the extension direction of a data signal line D. This configuration manner is not limiting. In other embodiments, the extension direction of the long side of the first compensation electrode 321 in the display region FA may intersect with the extension direction of the scan signal line S.

Figure 5:
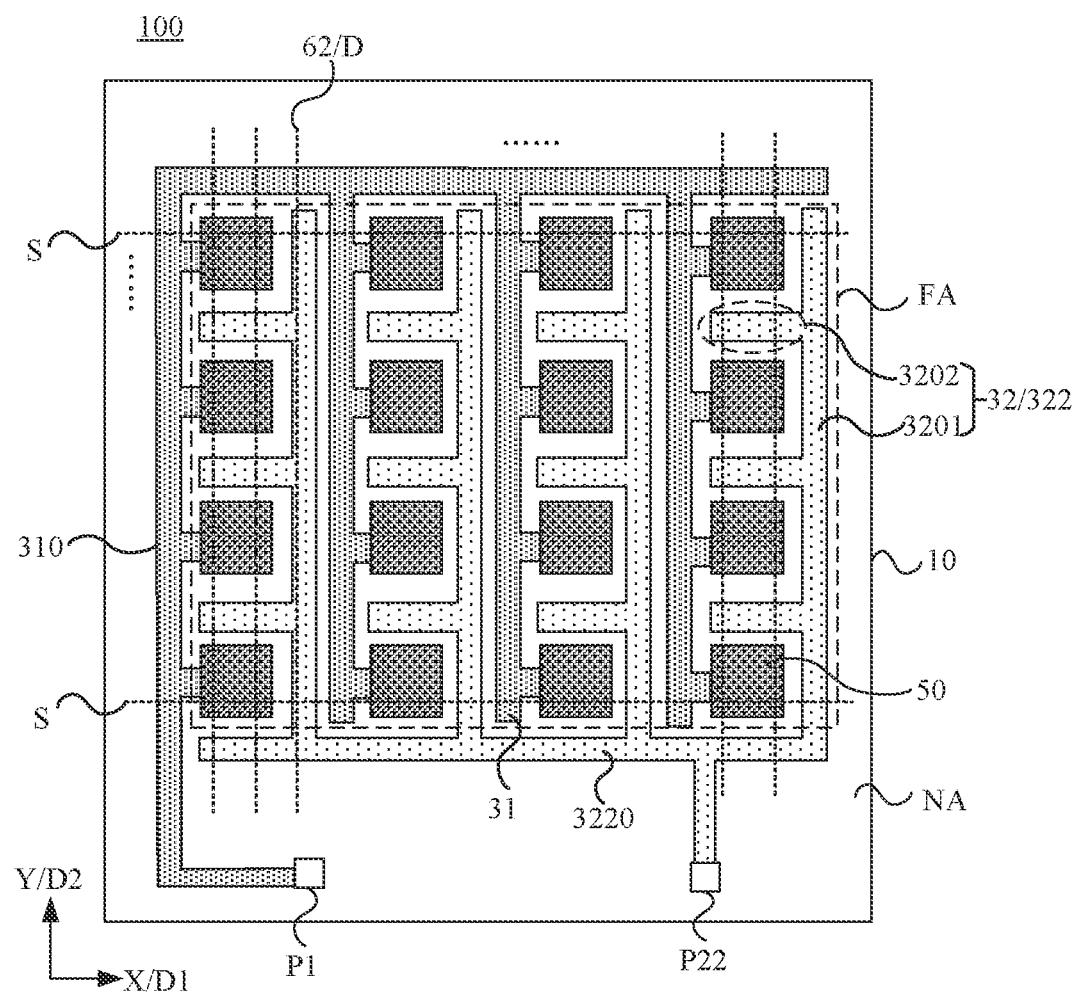
FIG. 5 is a top view illustrating a structure of another display panel according to an embodiment of the present application.

As another possible embodiment, FIG. 5 is a top view illustrating a structure of another display panel according to an embodiment of the present application, and as shown in FIG. 5, optionally, the compensation electrode portion 32 includes at least one second compensation electrode portion 322, the first display signal lines 62 include data signal lines D configured to transmit the data signals, and the second compensation electrode portion 321 overlaps with the data signal lines D along the direction perpendicular to the plane where the substrate 10 is located. The second compensation electrode portion 322 is configured to receive a second compensation signal, and the second compensation signal may be determined according to the data signal.

The second compensation signal is determined according to the data signal, and specifically, the voltage variation amount of the second compensation signal may be proportional to the opposite number of a voltage variation amount of the data signal. In the case where the data signal generates a relatively large noise, the second compensation signal on the second compensation electrode portion 322 may be adjusted adaptively according to the voltage variation amount of the data signal so that the voltage variation amount of the second compensation signal is proportional to the opposite number of the voltage variation amount of the data signal. With this configuration, the second compensation electrode portion 322 can be configured to reduce the interference to the touch signal caused by the data signal lines D overlapping with the second compensation electrode portion 322, thereby improving the touch precision.

Figure 6:
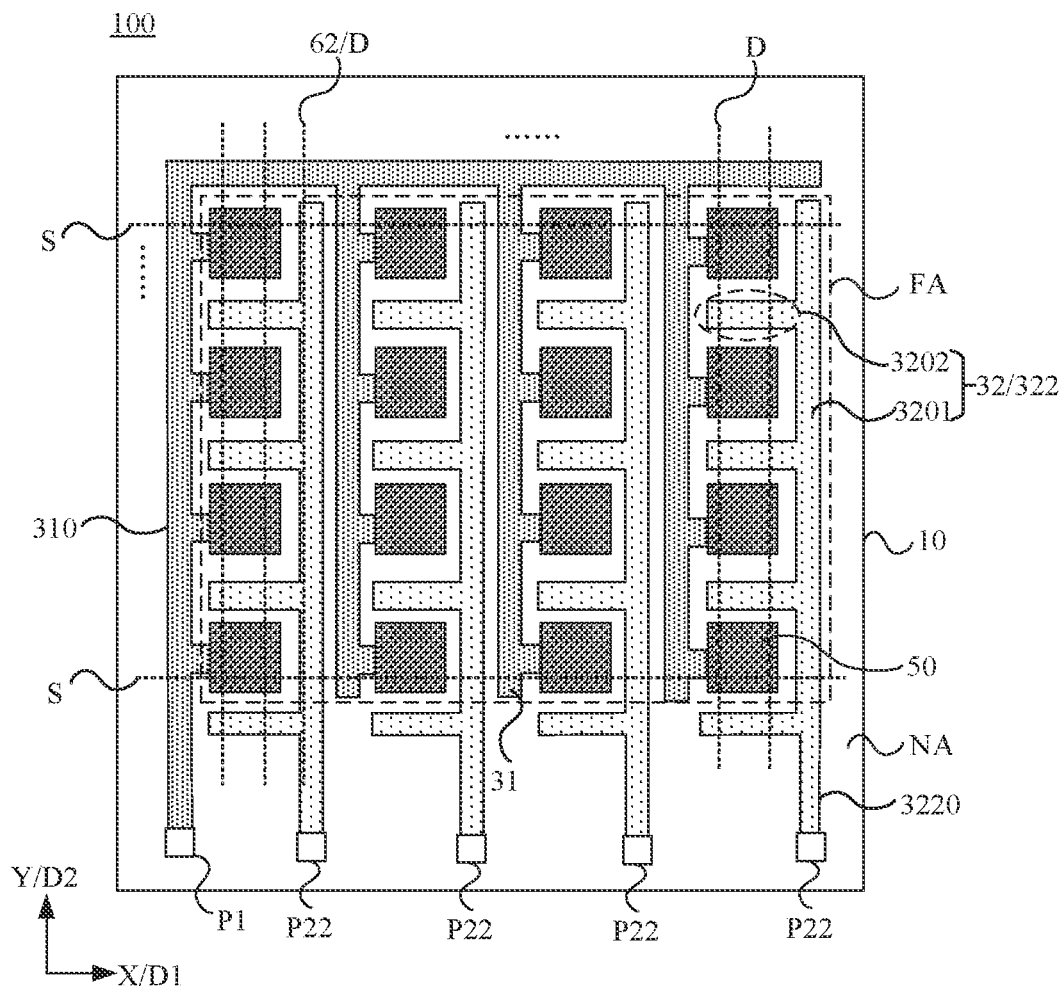
FIG. 6 is a top view illustrating a structure of another display panel according to an embodiment of the present application.

It is to be noted that FIG. 5 illustrates only an example in which the compensation electrode portion 32 includes multiple second compensation electrode portions 322 disposed side by side and the multiple second compensation electrode portions 322 are electrically connected through a second compensation signal line 3220 in the non-display region NA. In this case, all the second compensation electrode portions 322 have the same voltage variation, and a control manner is simpler. For example, as shown in FIG. 5, the driver chip may apply the second compensation signal to each of the second compensation electrode portions 322 through a second compensation pad P22 and the second compensation signal line 3220. This configuration manner is not limiting. In other embodiments, when the compensation electrode portion 32 includes the multiple second compensation electrode portions 322, all the second compensation electrode portions 322 may be electrically connected to different second compensation pads P22 through different second compensation signal lines 3220, as shown in FIG. 6 which is a top view illustrating a structure of another display panel according to an embodiment of the present application. In this case, each of the second compensation electrode portions 322 overlaps with different data signal lines D and the second compensation signal can be independently applied. Therefore, the variation of the second compensation signal on each of the second compensation electrode portions 322 can be adjusted adaptively according to the interference, caused by data signals on the data signal lines D at different positions, to a touch signal of a touch sensor overlapping with the data signal lines D, thereby further improving the touch precision.

Further, in other embodiments, the compensation electrode portion 32 may include one second compensation electrode portion 322, which is illustrated exemplarily hereinafter.

It is to be noted that FIGS. 5 and 6 illustrate only an example in which the second compensation electrode portion 322 and the second compensation signal line 3220 are disposed in the same layer, and in other embodiments, the second compensation electrode portion 322 and the second compensation signal line 3220 may be disposed in different layers and are electrically connected through punched holes, which is not limited in the embodiment of the present application.

It is also to be noted that FIG. 5 illustrates only an example in which the extension direction of the long side of the second compensation electrode portion 322 in the display region FA is the same as the extension direction of the data signal line D and the multiple second compensation electrode portions 322 are disposed side by side along the extension direction of the scan signal line S. This configuration manner is not limiting. In other embodiments, the extension direction of the long side of the second compensation electrode 322 in the display region FA may intersect with the extension direction of the data signal line D.

Figure 7:
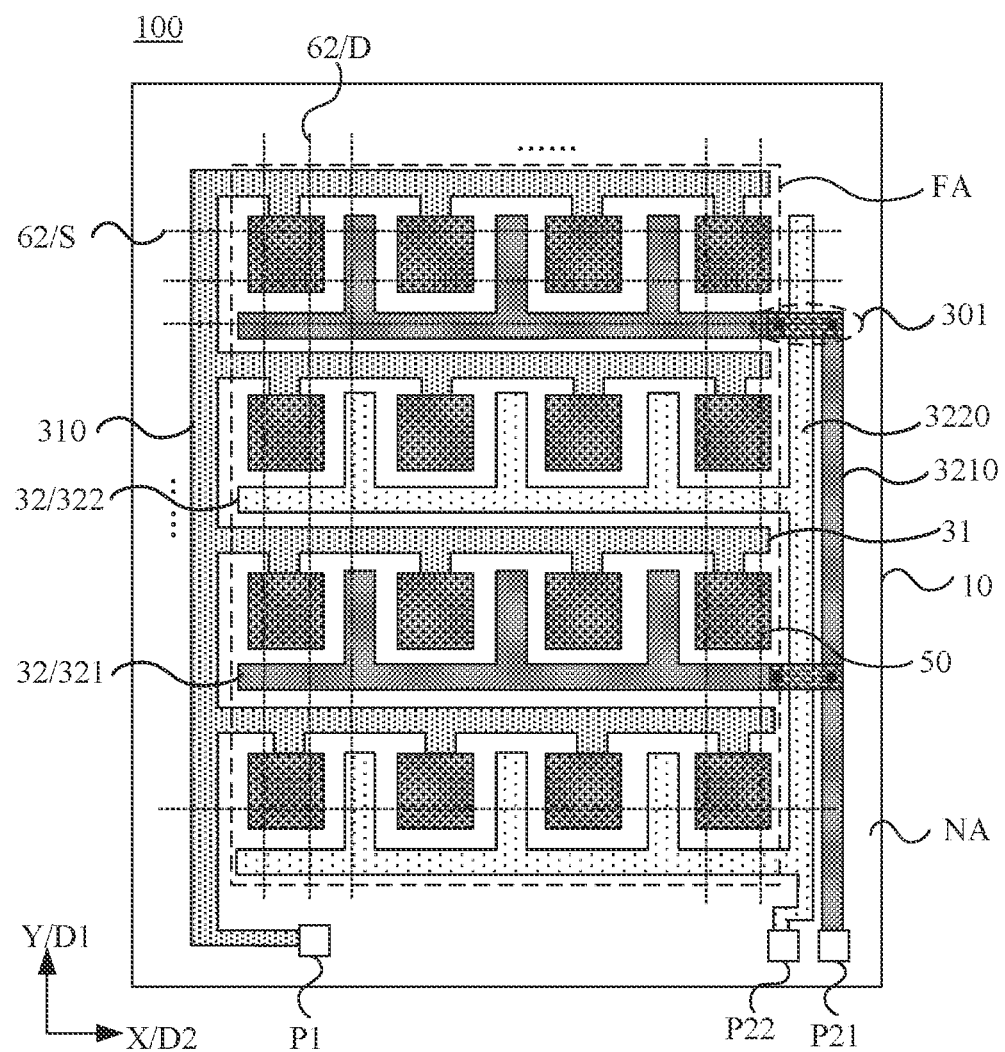
FIG. 7 is a top view illustrating a structure of another display panel according to an embodiment of the present application.

As another possible embodiment, FIG. 7 is a top view illustrating a structure of another display panel according to an embodiment of the present application, and as shown in FIG. 7, optionally, the compensation electrode portion 32 includes at least one first compensation electrode portion 321 and at least one second compensation electrode portion 322, the first display signal lines 62 include scan signal lines S and data signal lines D, the scan signal lines S are configured to transmit the scan signals, and the data signal lines D are configured to transmit the data signals, along the direction perpendicular to the plane where the substrate 10 is located, a first compensation electrode portion 321 overlaps with the scan signal lines S and a second compensation electrode portion 322 overlaps with the data signal lines 322, the first compensation electrode portion 321 is configured to receive the first compensation signal determined according to the scan signal, and the second compensation electrode portion 322 is configured to receive the second compensation signal determined according to the data signal, where the first compensation electrode portion 321 and the second compensation electrode portion 322 are insulated from each other. Since each of the scan signal line and the data signal line may cause the interference to the touch signal, in this embodiment, the compensation electrode portion 32 is divided into two parts. One part is constituted by the first compensation electrode portion 321, and the other part is constituted by the second compensation electrode portion 322 so that the interference to the touch signal caused by the scan signal lines S overlapping with the first compensation electrode portion 321 is reduced by the first compensation electrode portion 321 and the interference to the touch signal caused by the data signal lines D overlapping with the second compensation electrode portion 322 is reduced by the second compensation electrode portion 322, thereby improving the touch precision.

In summary, in the preceding embodiments, the manner in which the compensation signal on the compensation electrode portion is determined is described in detail. Based on any one of the preceding embodiments, the manner in which the common electrode portions and the compensation electrode portions are arranged is described in further detail below.

As a possible arrangement manner, referring to FIG. 3, in an embodiment, in the display region FA, the common electrode portions 31 and the compensation electrode portions 32 are alternately disposed side by side along a first direction D1, where the first direction D1 is parallel to the plane where the substrate 10 is located. This configuration is advantageous to make the compensation electrode portions 32 uniformly disposed in the display region FA without affecting the electrical connection of the common electrode portions 31 to the light-emitting devices, thereby improving a noise reduction effect.

In an embodiment, the first direction D1 is parallel to the extension direction X of the scan signal line S, or a first direction D2 is parallel to the extension direction Y of the data signal line D.

For example, referring to FIG. 3, when the compensation electrode portion 32 includes only the first compensation electrode portion 321, optionally, the first direction D1 is parallel to the extension direction Y of the data signal line D, that is, the common electrode portions 31 and the first compensation electrode portions 321 are disposed side by side along the extension direction Y of the data signal line D. This configuration is advantageous to ensure that the first compensation electrode portion 321 and the scan signal lines S have relatively large overlapping areas so that the interference to the touch signal caused by the scan signal lines overlapping with the first compensation electrode portion 321 is reduced by the first compensation electrode portion 321, thereby improving the touch precision. In addition, with this configuration, the first compensation electrode portions 321 overlap with scan signal lines S in different regions. In some embodiments, when the first compensation electrode portions 321 are electrically connected to different first compensation pads P21 separately (as shown in FIG. 4), variation amounts necessary for the first compensation signals on different first compensation electrode portions 321 may be determined according to the voltage variations of the scan signals on different scan signal lines S, thereby further improving the touch precision.

For example, referring to FIG. 5, when the compensation electrode portion 32 includes only the second compensation electrode portion 322, optionally, the first direction D1 is parallel to the extension direction X of the scan signal line S, that is, the common electrode portions 31 and the second compensation electrode portions 322 are disposed side by side along the extension direction X of the scan signal line S. This configuration is advantageous to ensure that the second compensation electrode portion 322 and the data signal lines D have relatively large overlapping areas so that the interference to the touch signal caused by the data signal lines overlapping with the second compensation electrode portion 322 is reduced by the second compensation electrode portion 322, thereby improving the touch precision. In addition, with this configuration, the second compensation electrode portions 322 overlap with data signal lines D in different regions. In some embodiments, when the second compensation electrode portions 322 are electrically connected to different second compensation pads P22 separately (as shown in FIG. 6), variation amounts necessary for the second compensation signals on different second compensation electrode portions 322 may be determined according to the voltage variations of the data signals on different data signal lines D, thereby further improving the touch precision.

For example, referring to FIG. 7, when the compensation electrode portion 32 includes the first compensation electrode portion 321 and the second compensation electrode portion 322, the first direction D1 may be parallel to the extension direction X of the scan signal line S or may be parallel to the extension direction Y of the data signal line D. FIG. 7 illustrates only an example in which the first direction D1 is parallel to the extension direction Y of the data signal line D.

With continued reference to FIG. 7, when the compensation electrode portions 32 include the first compensation electrode portions 321 and the second compensation electrode portions 322 which are insulated from the first compensation electrode portions 321, optionally, in the display region FA, the first compensation electrode portions 321, the common electrode portions 31, and the second compensation electrode portions 322 are alternately disposed side by side along the first direction D1, and one first compensation electrode portion 321 or one second compensation electrode portion 322 exists between two adjacent common electrode portions 31. With this configuration, the first compensation electrode portions 321 and the second compensation electrode portions 322 can be uniformly disposed in the display region FA without affecting the electrical connection of the common electrode portions 31 to the light-emitting devices in light-emitting units 50, which is advantageous to improve the noise reduction effect.

With continued reference to FIG. 7, when the multiple common electrode portions 31, the multiple first compensation electrode portions 321, and the multiple second compensation electrode portions 322 are included in the display region FA, optionally, the first compensation electrode portions 321 are electrically connected in the non-display region NA, the second compensation electrode portions 322 are electrically connected in the non-display region NA, and the common electrode portions 31 are electrically connected in the non-display region NA. With this configuration, the first compensation electrode portions 321 at different positions may receive the same first compensation signal, the second compensation electrode portions 322 at different positions may receive the same second compensation signal, and the common electrode portions 31 at different positions may receive the same common signal and transmit the same common signal to the light-emitting devices for display driving. The control manner is simpler and advantageous to reduce the number of pads.

In an embodiment, as shown in FIG. 7, the first compensation electrode portions 321 in the display region FA may be electrically connected to the same first compensation pad P21 through the same first compensation signal line 3210 in the non-display region NA, the second compensation electrodes 322 in the display region FA may be electrically connected to the same second compensation pad P22 through the same second compensation signal line 3220 in the non-display region NA, and the common electrode portions 31 may be electrically connected to the same common pad P1 through the same common signal line 310.

Since the first compensation electrode portions 321, the second compensation electrode portions 322, and the common electrode portions 31 are disposed in the same film, in order that it is ensured that the first compensation electrode portions 321, the second compensation electrode portions 322, and the common electrode portions 31 are insulated from each other and can be electrically connected to the pads corresponding to the first compensation electrode portions 321, the second compensation electrode portions 322, and the common electrode portions 31 separately, optionally, the first compensation electrode portions 321, the second compensation electrode portions 322, and the common electrode portions 31 in the display region FA are disposed side by side, and any two of the first compensation signal line 3210, the second compensation signal line 3220, and the common signal line 310 in the non-display region NA are insulated, in the manner of disposing bridges in different layers, from each other at the position where a wiring conflict occurs.

For example, as shown in FIG. 7, the compensation electrode portions 32 include the multiple first compensation electrode portions 321 and the multiple second compensation electrode portions 322, and the first compensation electrode portions 321, the second compensation electrode portions 322, and the common electrode portions 31 are alternately disposed side by side in the display region FA. When the first compensation electrode portions 321 are connected to the same first compensation pad P21, the second compensation electrode portions 322 are connected to the same second compensation pad P22, and the common electrode portions 31 are connected to the same common pad P1, the wiring conflict may occur between two of the first compensation signal line 3210, the second compensation signal line 3220, and the common signal line 310. For example, FIG. 7 illustrates an example in which the wiring conflict exists between the first compensation signal line 3210 and the second compensation signal line 3220 in the non-display region NA. In this embodiment, a bridge 301 is disposed so that the first compensation signal line 3210 in the non-display region NA is electrically connected to the first compensation electrode portions 321 in the display region FA and the first compensation electrode portions 321 and the second compensation electrode portions 322 can be insulated from each other, thereby applying corresponding compensation signals independently.

It is to be noted that in order that it is convenient to distinguish the common electrode portions 31, the first compensation electrode portions 321, and the second compensation electrode portions 322, the common electrode portions 31, the first compensation electrode portions 321, and the second compensation electrode portions 322 are represented in FIG. 7 in different filling patterns, and the common signal line 310, the first compensation signal line 3210, and the second compensation signal line 3220 corresponding to the common electrode portions 31, the first compensation electrode portions 321, and the second compensation electrode portions 322 separately are represented in FIG. 7 in consistent filling patterns separately. In FIG. 7, the common electrode portions 31, the first compensation electrode portions 321, the second compensation electrode portions 322, the common signal line 310, the second compensation signal line 3220, and part of the first compensation signal line 3210 may be disposed in the same layer, and the bridge 301 and the common electrode portions 31 are disposed in different layers. Filling manners in FIGS. 3 to 5 are similar to this, and the details are not repeated here.

Figure 8:
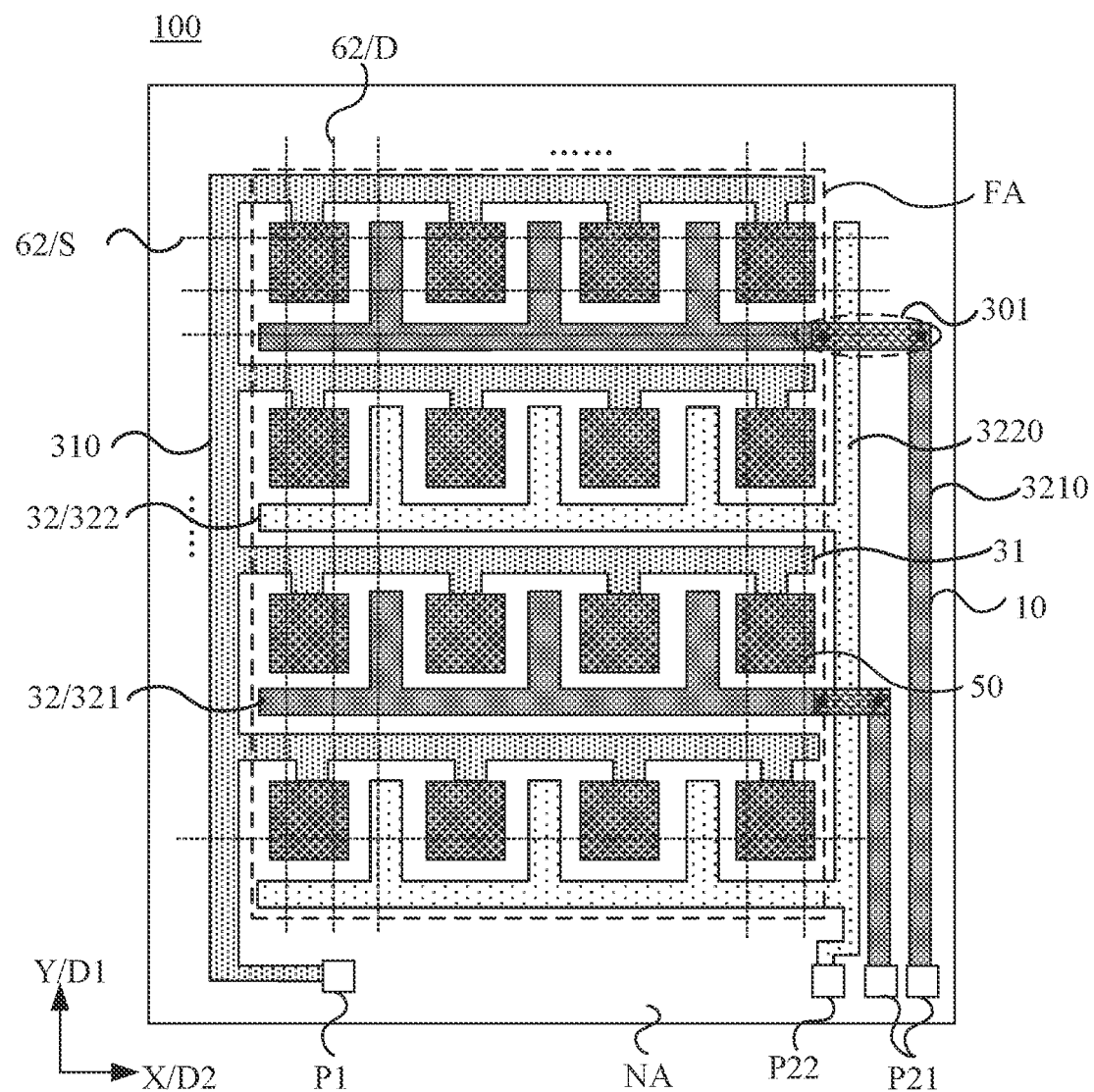
FIG. 8 is a top view illustrating a structure of another display panel according to an embodiment of the present application.

FIG. 8 is a top view illustrating a structure of another display panel according to an embodiment of the present application. As shown in FIG. 8, in other embodiments, when the compensation electrode portions 32 include the multiple first compensation electrode portions 321 and the multiple second compensation electrode portions 322 and the first compensation electrode portions 321, the second compensation electrode portions 322, and the common electrode portions 31 are alternately disposed side by side in the display region FA, the first compensation electrode portions 321 may be insulated in the non-display region NA, and/or the second compensation electrode portions 322 may be insulated in the non-display region NA, and the common electrode portions 31 are electrically connected in the non-display region NA. FIG. 8 illustrates an example in which the first compensation electrode portions 321 are insulated in the non-display region NA.

In an embodiment, the first compensation electrode portions 321 in the display region FA may be electrically connected to different first compensation pads 21 through different first compensation signal lines 3210 in the non-display region NA separately, and/or the second compensation electrodes 322 in the display region FA may be electrically connected to different second compensation pads P22 through different second compensation signal lines 3220 separately, and the common electrode portions 31 may be electrically connected to the same common pad P1 through the same common signal line 310. As explained above, with this configuration, the compensation signals on the first compensation electrode portions 321 and/or the compensation signals on the second compensation electrode portions 322 can be adjusted flexibly, thereby improving the noise reduction effect.

Referring to FIG. 3 or FIG. 5, optionally, the display panel 100 includes multiple light-emitting units 50 arranged in an array (for example, the multiple light-emitting units 50 may be arranged in an array along the first direction D1 and the second direction D2), where in the display region FA, the common electrode portion 31 is electrically connected to at least one row of light-emitting units 50 disposed side by side along the second direction D2, and the compensation electrode portion 32 includes a first electrode sub-portion 3201 and a second electrode sub-portion 3202, where the extension direction of the first electrode sub-portion 3201 intersects with the extension direction of the second electrode sub-portion 3202, the first electrode sub-portion 3201 is disposed between two rows of light-emitting units 50 adjacent to each other along the first direction D1, and the second electrode sub-portion 3202 is disposed between two light-emitting units 50 adjacent to each other along the second direction D2.

Each light-emitting unit 50 may include at least one light-emitting device 51. For example, in an embodiment, the display panel 100 may include light-emitting devices 51 whose emitted colors are red, green, and blue separately, and one light-emitting unit 50 may include three light-emitting devices 51 whose emitted colors are red, green, and blue separately. With this configuration, preparation difficulty can be reduced. Of course, in other embodiments, one light-emitting unit 50 may include only one light-emitting device 51 or more light-emitting devices 51, which is not limited in the embodiment of the present application.

The second direction D2 intersects with the first direction D1 and is parallel to the plane where the substrate 10 is located. For example, when the first direction D1 is parallel to the extension direction X of the scan signal line S, the second direction D2 may be parallel to the extension direction Y of the data signal line D (as shown in FIG. 5), or when the first direction D1 is parallel to the extension direction Y of the data signal line D, the second direction D2 may be parallel to the extension direction X of the scan signal line S (as shown in FIG. 3).

In this embodiment, in the display region FA, the compensation electrode portion 32 (the first compensation electrode portion 321/the second compensation electrode portion 322) includes the first electrode sub-portion 3201 and the second electrode sub-portion 3202 whose extension directions intersect with each other, where the extension direction of the first electrode sub-portion 3201 intersects with the extension direction of the second electrode sub-portion 3202, the first electrode sub-portion 3201 is disposed between the two rows of light-emitting units 50 adjacent to each other along the first direction D1, and the second electrode sub-portion 3202 is disposed between the two light-emitting units 50 adjacent to each other along the second direction D2. With this configuration, the relatively short second electrode sub-portion 3202 can be used for compensating for part of the first display signal lines 62 with which the relatively long first electrode sub-portion 3201 cannot overlap and it is ensured that the compensation electrode portion 32 can overlap with more first display signal lines 62, thereby reducing the interference to the touch signal caused by the first display signal lines 62 and improving the touch precision.

It is to be noted that in the display region FA, FIG. 3 and FIG. 5 illustrate only an example in which the common electrode portion 31 and the first electrode sub-portion 3201 are disposed between the two rows of the same light-emitting units 50 adjacent to each other along the first direction D1. In this case, the second electrode sub-portion 3202 is disposed on a side of the first electrode sub-portion 3201 along the first direction D1, and the compensation electrode portion 32 in the display region FA is in the shape of a comb. The configuration manner shown in FIG. 7 is similar to that in FIG. 3, and the details are not repeated here.

Figure 9:
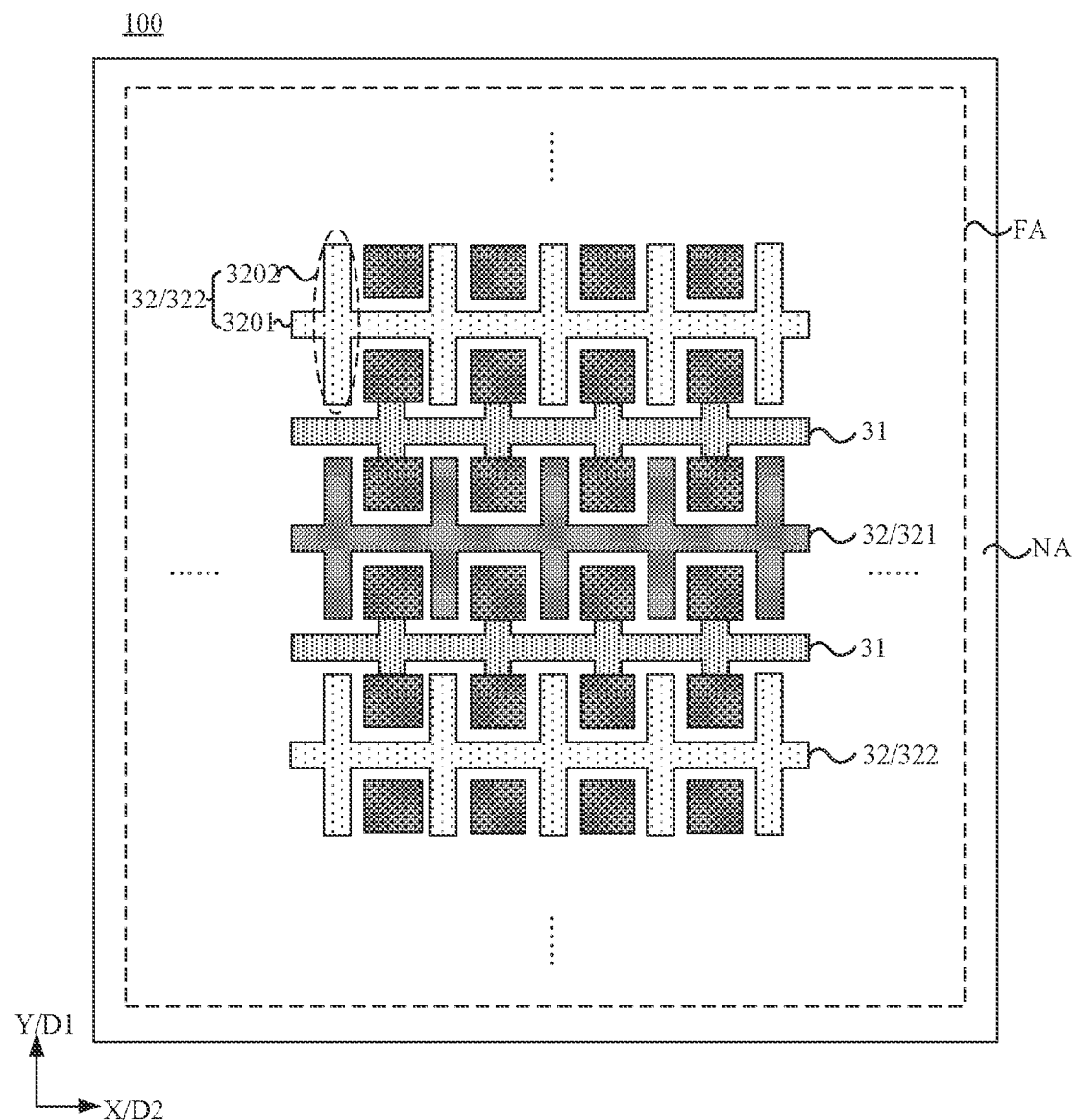
FIG. 9 is a top view illustrating a structure of another display panel according to an embodiment of the present application.

However, the preceding configuration manner is not unique. FIG. 9 is a top view illustrating a structure of another display panel according to an embodiment of the present application. As shown in FIG. 9, optionally, in the display region FA, the common electrode portion 31 is electrically connected to two adjacent rows of light-emitting units 50 along the first direction D1, and the compensation electrode portion 32 includes a first electrode sub-portion 3201 and a second electrode sub-portion 3202, where the extension direction of the first electrode sub-portion 3201 intersects with the extension direction of the second electrode sub-portion 3202, the first electrode sub-portion 3201 is disposed between two adjacent rows of light-emitting units 50 along the first direction D1, and the second electrode sub-portion 3202 is disposed between two adjacent light-emitting units 50 along the second direction D2.

The main difference between this embodiment and the display panel shown in FIG. 3 lies in that the common electrode portion 31 and the first electrode sub-portion 3201 in the display region FA are separately disposed between the different two rows of light-emitting units 50 adjacent to each other along the first direction D1, and the second electrode sub-portion 3202 is disposed on two opposite sides of the first electrode sub-portion 3201 along the first direction D1 with the first electrode sub-portion 3201 as a symmetry axis. With this configuration, it is more advantageous to implement the insulation between the common electrode portion 31 and the compensation electrode portion 32, and the preparation difficulty can be reduced.

It is to be noted that for the configuration manner shown in FIG. 9, first compensation electrode portions 321 may be electrically connected in the non-display region NA or may be insulated from each other in the non-display region NA according to actual requirements, which is not limited in the embodiment of the present application. Similarly, second compensation electrode portions 322 may be electrically connected in the non-display region NA or may be insulated from each other in the non-display region NA according to the actual requirements, which is not limited in the embodiment of the present application. Common electrode portions 31 may be electrically connected to each other in the non-display region NA.

In summary, in the preceding embodiments, the shapes and power supply manners of the compensation electrode portions 32 are described in detail through an example in which the common electrode portions 31 and the compensation electrode portions 32 are alternately disposed side by side along the first direction D1 in the display region FA. Other possible arrangement manners of the common electrode portion 31 and the compensation electrode portion 32 are exemplarily illustrated below through only an example in which compensation electrode portions 32 include a first compensation electrode portion 321 and a second compensation electrode portion 322 which are insulated from each other.

Figure 10:
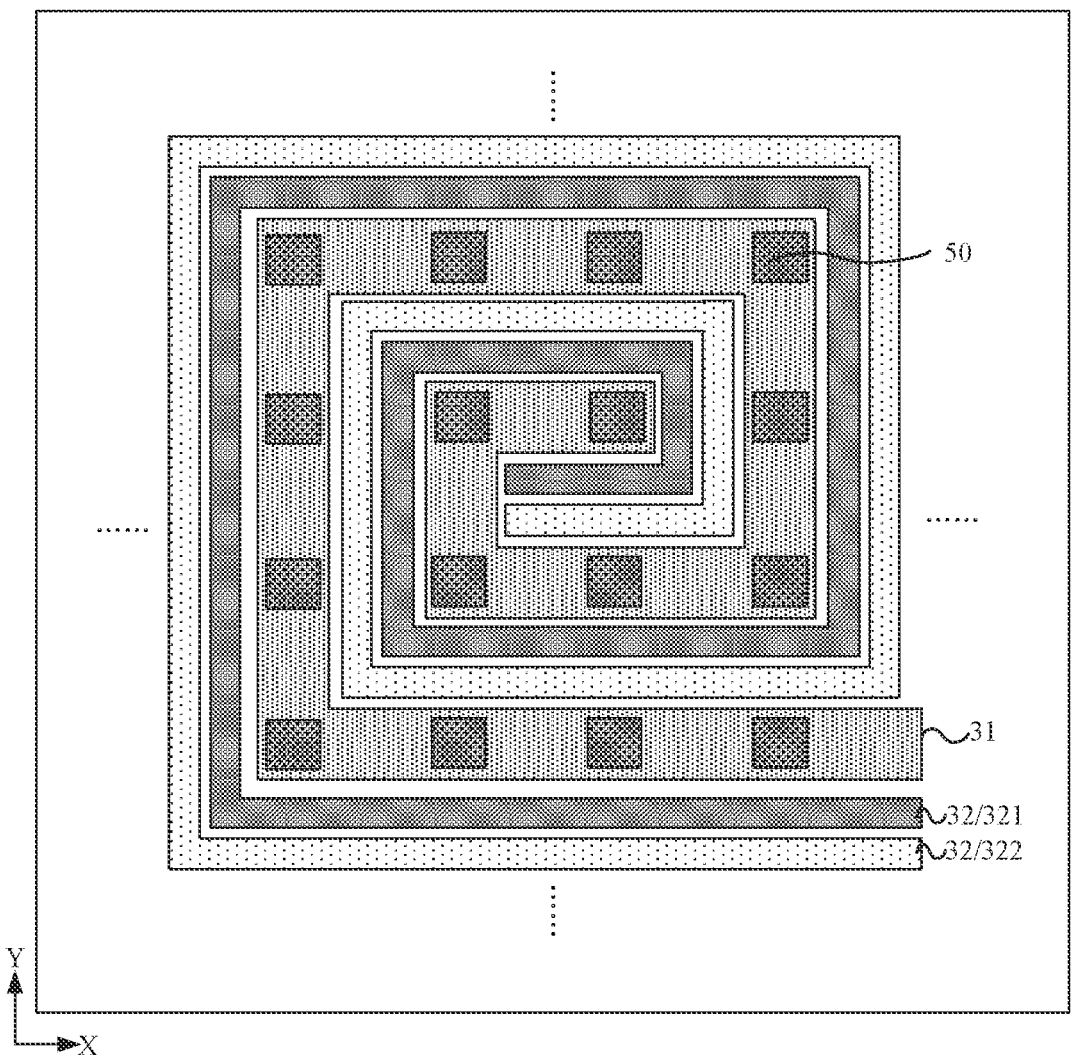
FIG. 10 is a top view illustrating a structure of another display panel according to an embodiment of the present application.

As another possible arrangement manner, FIG. 10 is a top view illustrating a structure of another display panel according to an embodiment of the present application, and as shown in FIG. 10, optionally, the common electrode portion 31 is disposed in a spiral shape, along the extension direction of the common electrode portion 31, the common electrode portion 31 is electrically connected to the light-emitting units 50 in sequence, and the compensation electrode portion 32 is disposed in a spiral shape and disposed side by side with the common electrode portion 31.

The extension direction of the common electrode portion 31 may be understood as the spiral winding direction of the common electrode portion 31. As shown in FIG. 10, the common electrode portion 31 may start from one light-emitting unit 50 in a corner (for example, the upper left corner, the lower left corner, the upper right corner, or the lower right corner) of the display panel and sequentially pass through the multiple light-emitting units 50 arranged in an array to form the spiral shape and to be electrically connected to the light-emitting devices in the light-emitting units 50. As described above, in this embodiment, one light-emitting unit 50 may include at least one light-emitting device.

Accordingly, the compensation electrode portion 32 is disposed in the spiral shape and disposed side by side with the common electrode portion 31. For example, FIG. 10 illustrates an example in which the compensation electrode portion 32 includes one spiral first compensation electrode portion 321 and one spiral second compensation electrode portion 322. In other embodiments, the compensation electrode portion 32 may include only one spiral first compensation electrode portion 321 or only one spiral second compensation electrode portion 322, which is not limited in the embodiment of the present application.

In the embodiment of the present application, the common electrode portion 31 and the compensation electrode portion 32 are disposed side by side in the spiral shape and insulated from each other so that the compensation electrode portion 32 can be distributed uniformly to overlap with as many first display signal lines as possible. Thus, the interference to the touch signal caused by signal variations on the first display signal lines is reduced, thereby improving the noise reduction effect. In addition, with this configuration, each of the common electrode portion 31 and the compensation electrode portion 32 can be integrally formed, and when the common electrode portion 31 is electrically connected to the common pad and the compensation electrode portion 32 is electrically connected to the compensation pad, the wiring of the common electrode portion 31 and the wiring of the compensation electrode portion 32 cannot affect each other, which is advantageous to reduce the preparation difficulty.

Figure 11:
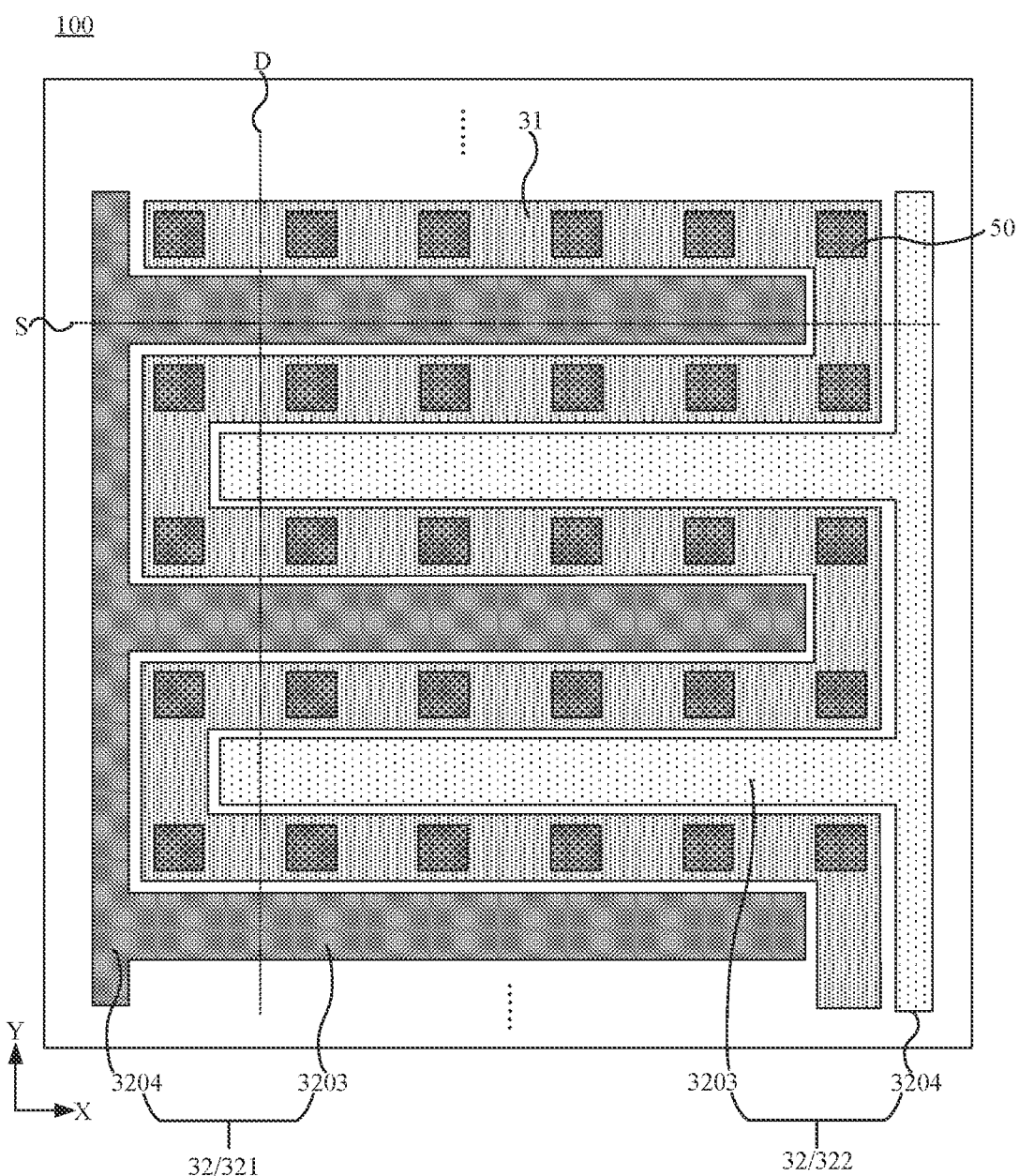
FIG. 11 is a top view illustrating a structure of another display panel according to an embodiment of the present application.

As another possible arrangement manner, FIG. 11 is a top view illustrating a structure of another display panel according to an embodiment of the present application, and as shown in FIG. 11, optionally, the common electrode portion 31 is disposed in the shape of a polyline, and along the extension direction of the common electrode portion 31, the common electrode portion 31 is electrically connected to the light-emitting units 50 in sequence, and the compensation electrode portion 32 is disposed in the shape of a comb and includes multiple tooth sub-portions 3203 and a main sub-portion 3204 connecting the multiple tooth sub-portions 3203, where a tooth sub-portion 3203 is inserted between two adjacent polyline segments of the common electrode portion 31.

The extension direction of the common electrode portion 31 may be understood as a polyline direction of the common electrode portion 31, where this polyline direction is not a fixed direction. As shown in FIG. 11, the common electrode portion 31 may start from one light-emitting unit 50 in a corner (for example, the upper left corner, the lower left corner, the upper right corner, or the lower right corner) of the display panel and sequentially pass through the multiple light-emitting units 50 arranged in an array to form the shape of the polyline and to be electrically connected to the light-emitting devices in the light-emitting units 50. As described above, in this embodiment, one light-emitting unit 50 may include at least one light-emitting device.

Accordingly, the compensation electrode portion 32 is disposed in the shape of the comb, where the tooth sub-portion 3203 of the compensation electrode portion 32 is inserted between the two adjacent polyline segments of the common electrode portion 31, and the main sub-portion 3204 of the compensation electrode portion 32 is used for connecting the multiple tooth sub-portions 3203. It is to be understood that a space for accommodating the compensation electrode portion 32 exists between two adjacent polyline segments whose extension directions are the same or approximately parallel to each other so that the tooth sub-portion 3203 of the compensation electrode portion 32 can be inserted between the two adjacent polyline segments. Therefore, the preceding two adjacent polyline segments of the common electrode portion 31 specifically refer to the two adjacent polyline segments whose extension directions are the same or approximately parallel to each other, rather than polyline segments whose extension directions intersect with each other and whose ends are connected to each other.

It is to be noted that FIG. 11 illustrates an example in which the compensation electrode portion 32 includes one first compensation electrode portion 321 in the shape of the comb and one second compensation electrode portion 322 in the shape of the comb. In this case, a tooth sub-portion 3203 of the first compensation electrode portion 321 and a tooth sub-portion 3203 of the second compensation electrode portion 322 are oppositely inserted between different adjacent polyline segments in the common electrode portion 31. In other embodiments, the compensation electrode portion 32 may include only the first compensation electrode portion 321 in the shape of the comb or may include only the second compensation electrode portion 322, which is not limited in the embodiment of the present application.

In the embodiment of the present application, the common electrode portion 31 is disposed in the shape of the polyline and the compensation electrode portion 32 is disposed in the shape of the comb so that the compensation electrode portion 32 can be distributed uniformly to overlap with as many first display signal lines as possible. Thus, the interference to the touch signal caused by the signal variations on the first display signal lines is reduced, thereby improving the noise reduction effect. In addition, with this configuration, each of the common electrode portion 31 and the compensation electrode portion 32 can be integrally formed, and when the common electrode portion 31 is electrically connected to the common pad and the compensation electrode portion 32 is electrically connected to the compensation pad, the wiring of the common electrode portion 31 and the wiring of the compensation electrode portion 32 cannot affect each other, which is advantageous to reduce the preparation difficulty.

With continued reference to FIG. 11, the display panel 100 includes the scan signal line S and the data signal line D, where the extension direction X of the scan signal line S intersects with the extension direction Y of the data signal line D. Optionally, the extension direction of the tooth sub-portion 3203 is parallel to the extension direction X of the scan signal line S, and the extension direction of the main sub-portion 3204 is parallel to the extension direction Y of the data signal line D. Of course, this configuration manner is not limiting. In other embodiments, optionally, the extension direction of the tooth sub-portion 3203 is parallel to the extension direction Y of the data signal line D, and the extension direction of the main sub-portion 3204 is parallel to the extension direction X of the scan signal line S.

When the common electrode portion 31 is disposed in the shape of the polyline and the compensation electrode portion 32 is disposed in the shape of the comb, in this embodiment, the tooth sub-portion 3203 of the compensation electrode portion 32 and the main sub-portion 3204 of the compensation electrode portion 32 are configured to be parallel to the extension direction of the scan signal line S and the extension direction of the data signal line D, respectively. This configuration is advantageous to reduce the difficulty in patterning when the film where the compensation electrode portion 32 and the common electrode portion 31 are disposed is prepared, thereby improving preparation efficiency.

Figure 12:
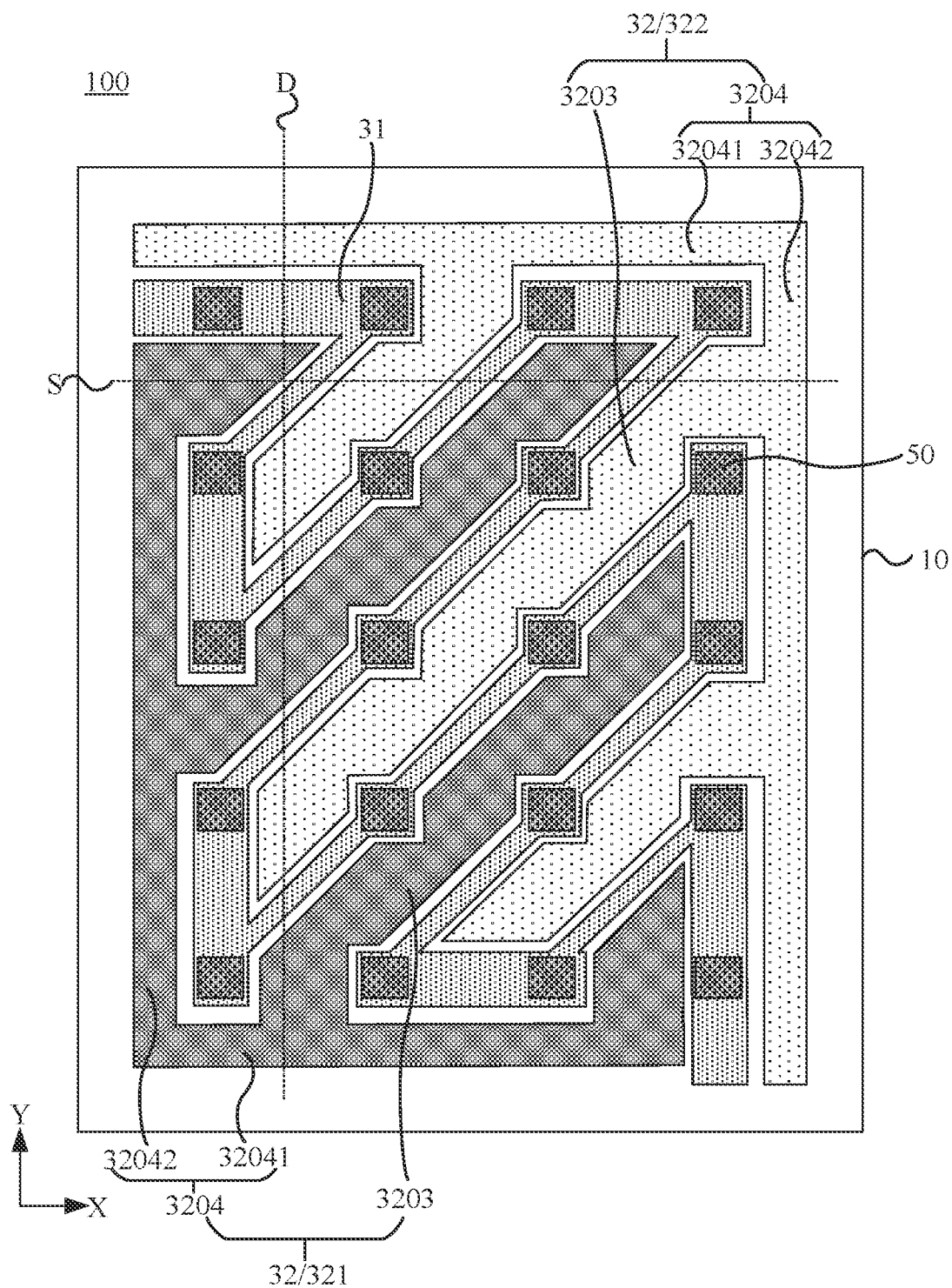
FIG. 12 is a top view illustrating a structure of another display panel according to an embodiment of the present application.

In addition, FIG. 12 is a top view illustrating a structure of another display panel according to an embodiment of the present application, and as shown in FIG. 12, in other embodiments, optionally, the extension direction of the tooth sub-portion 3203 intersects with each of the extension direction of the scan signal line S and the extension direction of the data signal line D, and the main sub-portion 3204 includes a first branch 32041 and a second branch 32042 and the extension direction of the first branch 32041 intersects with the extension direction of the second branch 32042.

In an embodiment, the extension direction of the first branch 32041 and the extension direction of the second branch 32042 may be parallel to the extension direction of the scan signal line S and the extension direction of the data signal line D, respectively. For example, FIG. 12 illustrates an example in which the extension direction of the first branch 32041 is parallel to the extension direction X of the scan signal line S and the extension direction of the second branch 32042 is parallel to the extension direction Y of the data signal line D. In other embodiments, the extension direction of the first branch 32041 may be configured to be parallel to the extension direction Y of the data signal line D, and the extension direction of the second branch 32042 may be configured to be parallel to the extension direction X of the scan signal line S.

When the common electrode portion 31 is disposed in the shape of the polyline and the compensation electrode portion 32 is disposed in the shape of the comb, in the embodiment of the present application, the extension direction of the tooth sub-portion 3203 is configured to intersect with each of the extension direction of the scan signal line S and the extension direction of the data signal line D. This configuration is advantageous for the compensation electrode portion 32 to overlap with as many first display signal lines as possible, thereby reducing the number of first display signal lines which cannot overlap with the compensation electrode portion 32 and further improving the noise reduction effect.

Figure 13:
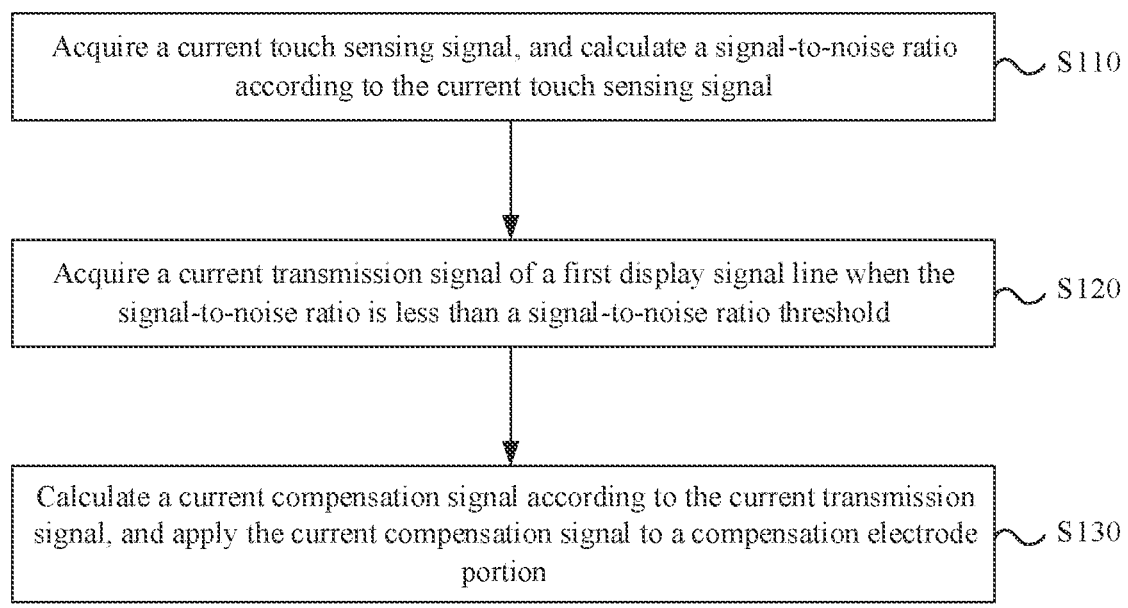
FIG. 13 is a flowchart of a display panel control method according to an embodiment of the present application.

Based on the same inventive concept, an embodiment of the present application provides a display panel control method. This control method is applicable to the display panel according to any embodiment of the present application so that the interference to a touch signal caused by a display signal is reduced, thereby improving touch precision. For a specific principle, reference may be made to the preceding description, and the details are not repeated here. The control method may be performed by a driver chip in the display panel. FIG. 13 is a flowchart of a display panel control method according to an embodiment of the present application. As shown in FIG. 13, the control method may include the steps below.

In S110, a current touch sensing signal is acquired, and a signal-to-noise ratio is calculated according to the current touch sensing signal.

The current touch sensing signal refers to a touch sensing signal at a current moment (or within a very short period of time), the position touched by a user may be determined according to the current touch sensing signal, and a corresponding interface may be displayed in response to the position touched by the user. However, when the user touches a display device, the touch sensing signal may be interfered by a display signal in a display driving layer, so a noise point is generated and the touch precision is affected. Therefore, the current touch sensing signal may be acquired in real time, and the signal-to-noise ratio is calculated according to the current touch sensing signal so that it is determined whether it is necessary to reduce a noise.

In an embodiment, in the preparation stage of the display panel and in the case where a display function is disabled, a standard touch sensing signal (with no noise) may be tested. Thus, in the subsequent stage where the product is actually used, the current touch sensing signal actually acquired may be compared with the standard touch sensing signal, and it is determined, according to the current touch sensing signal actually acquired and the standard touch sensing signal, whether the noise exists. If the noise exists, the signal-to-noise ratio may be calculated according to the noise. It is to be understood that the less the signal-to-noise ratio, the larger the noise, that is, the larger the interference to the touch signal caused by the display signal. Therefore, it may be determined, according to the calculated signal-to-noise ratio, whether it is necessary to reduce the noise.

In S120, a current transmission signal of a first display signal line is acquired when the signal-to-noise ratio is less than a signal-to-noise ratio threshold.

A specific value of the signal-to-noise ratio threshold may be set according to experience and is not limited in the embodiment of the present application. Specifically, the signal-to-noise ratio threshold may characterize the signal-to-noise ratio corresponding to the largest noise which the display panel allows to exist. If the signal-to-noise ratio actually calculated is less than the signal-to-noise ratio threshold, it indicates that the noise has exceeded a standard and it is necessary to reduce the noise, if the signal-to-noise ratio actually calculated is greater than the signal-to-noise ratio threshold, it indicates that the noise is relatively small and no noise reduction may be performed, and if the signal-to-noise ratio actually calculated is equal to the signal-to-noise ratio threshold, the noise reduction may be performed or no noise reduction may be performed, which is not limited in the embodiment of the present application.

The first display signal line refers to a signal line which is disposed in the display driving layer and configured to transmit a first display signal. As described above, the first display signal has a non-fixed potential, that is, the voltage of the first display signal varies. Therefore, the interference to the touch sensing signal is easily caused by the first display signal. Optionally, the first display signal line may include a scan signal line and/or a data signal line.

The current transmission signal of the first display signal line specifically refers to a first display signal on the first display signal line whose potential varies. The current transmission signal of the first display signal line may be acquired from the driver chip. It is to be understood that the driver chip controls a signal which will be transmitted by the first display signal line, and therefore, the current transmission signal of the first display signal line may be acquired from the driver chip.

In an embodiment, the current transmission signal of the first display signal line may be acquired once every first period, where the first period refers to a display driving period of one row of pixels. In the display driving period of one row of pixels, each of the voltage on the scan signal line and the voltage on the data signal line varies, which may cause the interference to the touch signal. Therefore, the display driving period of one row of pixels may be used as the first period, and the current transmission signal of the first display signal line may be acquired once every first period. After the current transmission signal of the first display signal line is acquired, a current compensation signal may be calculated according to the current transmission signal, and the corresponding noise reduction may be performed. For details, reference is made to S130.

In S130, the current compensation signal is calculated according to the current transmission signal, and the current compensation signal is applied to a compensation electrode portion.

The current compensation signal refers to a voltage which needs to be applied to the compensation electrode portion currently. According to the preceding explanation, it is to be understood that the voltage of the current compensation signal is different from the voltage of the compensation electrode portion at a previous moment. In this manner, the voltage on the compensation electrode portion may be varied. Thus, the varying compensation signal may be applied to the compensation electrode portion so that the interference to the touch signal caused by the variation of the first display signal is compensated/reduced, thereby improving the touch precision. The calculation process of the current compensation signal is described in detail hereinafter, and the details are not repeated here.

In summary, according to the technical solution implemented by the present application, the current touch sensing signal is acquired and the signal-to-noise ratio is calculated according to the current touch sensing signal, the current transmission signal of the first display signal line is acquired when the signal-to-noise ratio is less than the signal-to-noise ratio threshold, and the current compensation signal is calculated according to the current transmission signal and the current compensation signal is applied to the compensation electrode portion so that the varying compensation signal can be applied to the compensation electrode portion and the varying compensation signal on the compensation electrode portion may be used for reducing the interference to the touch signal caused by the varying first display signal in the display driving layer, thereby improving the touch precision.

Figure 14:
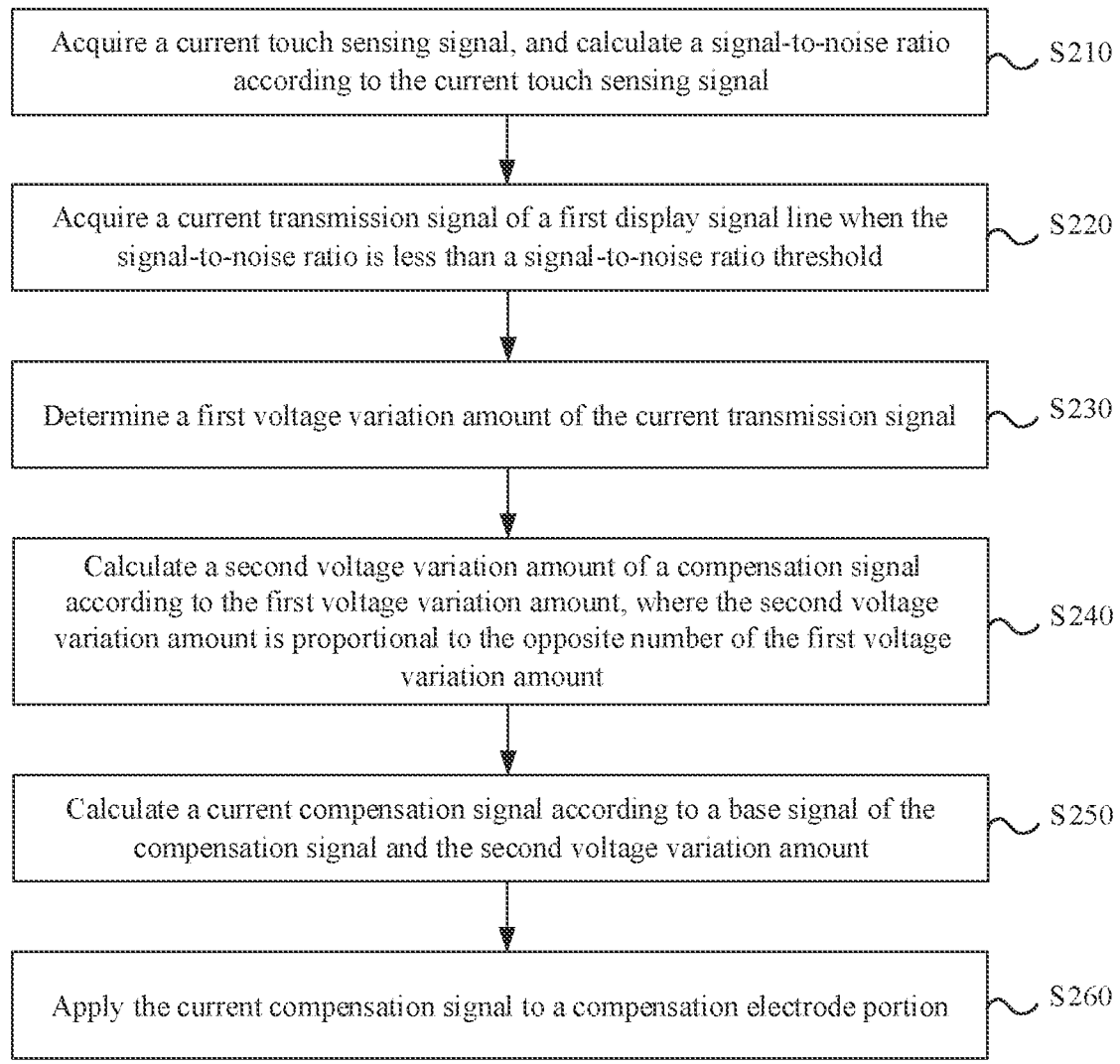
FIG. 14 is a flowchart of another display panel control method according to an embodiment of the present application.

Based on the preceding embodiment, FIG. 14 is a flowchart of another display panel control method according to an embodiment of the present application, and the calculation manner of the current compensation signal is described in detail, and similarities to the preceding embodiment are not repeated here. As shown in FIG. 14, the control method may include the steps below.

In S210, the current touch sensing signal is acquired, and the signal-to-noise ratio is calculated according to the current touch sensing signal.

In S220, the current transmission signal of the first display signal line is acquired when the signal-to-noise ratio is less than the signal-to-noise ratio threshold.

As described above, after the current transmission signal of the first display signal line is acquired, the current compensation signal may be calculated according to the current transmission signal of the first display signal line. For details about calculation steps, reference is made to S230 to S250.

In S230, a first voltage variation amount of the current transmission signal is determined.

The first voltage variation amount refers to a voltage variation amount of the first display signal, which is a vector. Specifically, the first voltage variation amount includes the absolute magnitude of a potential variation and the variation direction of the potential variation (for example, the variation direction is positive/negative).

In S240, a second voltage variation amount of the compensation signal is calculated according to the first voltage variation amount, where the second voltage variation amount is proportional to the opposite number of the first voltage variation amount.

The compensation signal refers to the signal on the compensation electrode portion, and as described above, the compensation signal has a non-fixed potential. The second voltage variation amount refers to a voltage variation amount of the compensation signal, which is also a vector.

The second voltage variation amount is proportional to the opposite number of the first voltage variation amount, that is, the voltage variation amount of the compensation signal is proportional to the opposite number of the voltage variation amount of the first display signal. In other words, the voltage variation direction of the compensation signal is opposite to the voltage variation direction of the first display signal, and the absolute value of the voltage variation amount of the compensation signal is proportional to the absolute value of the voltage variation amount of the first display signal. For example, assuming that the first voltage variation amount is +5 V, the second voltage variation amount may be $-K*5$ V, where K is a proportionality constant and is a positive number.

As can be seen from the preceding explanation of the principle, with this configuration, the variation amount of inductive capacitance caused by the voltage variation of the compensation signal on the compensation electrode portion can be used for reducing or cancelling out the variation amount of inductive capacitance caused by the voltage variation of the first display signal on the first display signal line so that the interference to the touch signal caused by the voltage variation of the first display signal on the first display signal line can be effectively reduced and the touch precision is improved.

In S250, the current compensation signal is calculated according to a base signal of the compensation signal and the second voltage variation amount.

The base signal of the compensation signal may be understood as the voltage of the compensation electrode portion at the previous moment. The voltage of the current compensation signal is the vector sum of the voltage of the base signal and the second voltage variation amount.

In S260, the current compensation signal is applied to the compensation electrode portion.

The current compensation signal is applied to the compensation electrode portion so that the voltage of the compensation signal on the compensation electrode portion can be varied (that is, the second voltage variation amount is varied), and the voltage variation amount of the compensation signal is proportional to the opposite number of the voltage variation amount of the first display signal. Thus, the variation amount of the inductive capacitance caused by the voltage variation of the compensation signal on the compensation electrode portion can be used for reducing or cancelling out the variation amount of the inductive capacitance caused by the voltage variation of the first display signal on the first display signal line so that the interference to the touch signal caused by the voltage variation of the first display signal on the first display signal line is effectively reduced, thereby improving the touch precision.

Based on the preceding embodiment, optionally, the first display signal line includes the scan signal line and the data signal line, and the compensation electrode portion includes a first compensation electrode portion and a second compensation electrode portion which are insulated from each other. Calculating the current compensation signal according to the current transmission signal, and applying the current compensation signal to the compensation electrode portion (S130) may specifically include the steps below.

A current first compensation signal is calculated according to a current transmission signal of the scan signal line, and the current first compensation signal is applied to the first compensation electrode portion.

A current second compensation signal is calculated according to a current transmission signal of the data signal line, and the current second compensation signal is applied to the second compensation electrode portion.

For the calculation manner in which the current first compensation signal is calculated according to the current transmission signal of the scan signal line and the calculation manner in which the current second compensation signal is calculated according to the current transmission signal of the data signal line, reference may be made to the preceding steps S230 to S250, and the details are not repeated here. In brief, the voltage variation amount which the first compensation signal needs to satisfy may be determined according to a voltage variation amount of a scan signal and the current first compensation signal is determined, and the voltage variation amount which the second compensation signal needs to satisfy may be determined according to a voltage variation amount of a data signal and the current second compensation signal is determined.

It is to be noted that in other embodiments, only the scan signal line may be used as the first display signal line and the compensation electrode portion may be configured to include only the first compensation electrode portion, or only the data signal line may be used as the first display signal line and the compensation electrode portion may be configured to include only the second compensation electrode portion, which is not limited in the embodiment of the present application.

Considering that the display panel includes multiple first display signal lines and voltages of different first display signal lines may vary at different moments to different variation degrees, in an embodiment, optionally, the first voltage variation amount is the maximum value among acquired voltage variation amounts of current transmission signals of all of the first display signal lines.

First, it is to be noted that all of the preceding first display signal lines are the same type of first display signal line, that is, the first display signal line with the maximum voltage variation amount is from the same type of first display signal line. For example, when the first display signal lines include scan signal lines and data signal lines, the maximum value among voltage variation amounts of current transmission signals of all of the scan signal lines is a first voltage variation amount corresponding to the scan signal lines, and similarly, the maximum value among voltage variation amounts of current transmission signals of all of the data signal lines is a first voltage variation amount corresponding to the data signal lines.

The first display signal line with the maximum voltage variation amount among all of the first display signal lines causes the largest interference to the touch signals. When the same compensation signal is applied to different positions of the compensation electrode portion, the first voltage variation amount is determined in the preceding manner. The largest noise in the first display signal lines may be used as a standard such that the compensation signal applied to the compensation electrode portion is determined, and the voltage variation amount of the compensation signal (that is, the second voltage variation amount) is proportional to the opposite number of the first voltage variation amount. The varying compensation signal applied to the compensation electrode portion is used for reducing the interference to the touch signal caused by the voltage variation of the first display signal line, thereby improving the touch precision.

For example, for the data signal lines, in a first period, a voltage variation exists on almost every data signal line and variation degrees are different. Therefore, the voltage variation amount of the data signal with the largest voltage variation may be selected as the first voltage variation amount. The second voltage variation amount corresponding to the second compensation electrode portion is calculated according to the first voltage variation amount so that the current compensation signal (the vector sum of the base signal and the second voltage variation amount) of the second compensation electrode portion is obtained, thereby reducing a noise generated by the data signal line.

For the scan signal lines, in a first period, voltage variations may exist on only part of the scan signal lines. When only one first compensation electrode portion exists (as shown in FIGS. 10 to 12) or the second compensation electrode portions are electrically connected (as shown in FIG. 3 or FIG. 7), the voltage variation amount of the scan signal with the largest voltage variation may be selected as the first voltage variation amount. The second voltage variation amount corresponding to the first compensation electrode portion is calculated according to the first voltage variation amount so that the current compensation signal (the vector sum of the base signal and the second voltage variation amount) of the first compensation electrode portion is obtained, thereby reducing a noise generated by the scan signal line.

As described above, in some embodiments, the compensation electrode portion may include multiple first compensation electrode portions and/or multiple second compensation electrode portions. In this case, if the first compensation electrode portions (or the second compensation electrode portions) are powered independently, the second voltage variation amount corresponding to each first compensation electrode portion (or each second compensation electrode portion) may be determined separately with the preceding method. Further, the current compensation signal of each first compensation electrode portion (or each second compensation electrode portion) is obtained. With this configuration, all of the first display signal lines of the same type may be divided into multiple units, and noise reduction is performed on each unit separately, which is advantageous to further improve the touch precision.

For example, using the scan signal lines as an example, referring to FIG. 4, the maximum value among voltage variation amounts of current transmission signals of all scan signal lines overlapping with one first compensation electrode portion may be used as the first voltage variation amount, and the second voltage variation amount corresponding to the first compensation electrode portion is determined according to the first voltage variation amount. The data signal lines are similar to the scan signal lines, and the details are not repeated here.

The preceding embodiments do not limit the scope of the present application. It is to be understood by those skilled in the art that various modifications, combinations, sub-combinations, and substitutions may be performed according to design requirements and other factors. Any modification, equivalent substitution, improvement, or the like made within the spirit and principle of the present application is within the scope of the present application.

What is claimed is:

1. A display panel, comprising:
    a substrate;

a pixel defining layer, disposed on a side of the substrate and comprising a plurality of pixel openings;

a first electrode layer, disposed on a side of the pixel defining layer facing away from the substrate and comprising a common electrode portion and a compensation electrode portion, wherein the common electrode portion and the compensation electrode portion are insulated from each other, and part of the common electrode portion is disposed in a respective pixel opening of the plurality of pixel openings; and a touch function layer, disposed on a side of the first electrode layer facing away from the substrate and comprising a touch electrode, wherein the compensation electrode portion and the touch electrode overlap with each other along a direction perpendicular to a plane where the substrate is located, and none of the compensation electrode portion and the touch electrode overlaps with the respective pixel opening;

wherein the common electrode portion is configured to receive a common signal, the compensation electrode portion is configured to receive a compensation signal, and the compensation signal has a non-fixed potential.

2. The display panel according to claim 1, further comprising a display driving layer between the substrate and the pixel defining layer, wherein the display driving layer comprises a first display signal line configured to transmit a first display signal, and the compensation electrode portion overlaps with the first display signal line along the direction perpendicular to the plane where the substrate is located;

wherein the compensation signal is determined according to the first display signal.

3. The display panel according to claim 2, wherein a voltage variation amount of the compensation signal is proportional to an opposite number of a voltage variation amount of the first display signal.

4. The display panel according to claim 2, wherein at least one of:

the compensation electrode portion comprises at least one first compensation electrode portion, the first display signal line comprises a scan signal line configured to transmit a scan signal, a first compensation electrode portion of the at least one first compensation electrode portion overlaps with the scan signal line along the direction perpendicular to the plane where the substrate is located, the first compensation electrode portion is configured to receive a first compensation signal, and the first compensation signal is determined according to the scan signal; or, the compensation electrode portion comprises at least one second compensation electrode portion, the first display signal line comprises a data signal line configured to transmit a data signal, a second compensation electrode portion of the at least one second compensation electrode portion overlaps with the data signal line along the direction perpendicular to the plane where the substrate is located, the second compensation electrode portion is configured to receive a second compensation signal, and the second compensation signal is determined according to the data signal; and wherein when the compensation electrode portion comprises at least one first compensation electrode portion and at least one second compensation electrode portion, the at least one first compensation electrode portion and the at least one second compensation electrode portion are insulated from each other.

5. The display panel according to claim 1, comprising a display region, wherein in the display region, common electrode portions and compensation electrode portions are alternately disposed side by side along a first direction, and wherein the first direction is parallel to the plane where the substrate is located.

6. The display panel according to claim 5, further comprising a plurality of light-emitting units arranged in an array, wherein in the display region, one of the common electrode portions is electrically connected to two adjacent rows of light-emitting units among the plurality of light-emitting units along the first direction; and one of the compensation electrode portions comprises a first electrode sub-portion and a second electrode sub-portion, wherein an extension direction of the first electrode sub-portion intersects with an extension direction of the second electrode sub-portion, the first electrode sub-portion is disposed between two adjacent rows of light-emitting units among the plurality of light-emitting units along the first direction, and the second electrode sub-portion is disposed between two adjacent light-emitting units along a second direction, wherein the second direction intersects with the first direction and is parallel to the plane where the substrate is located.

7. The display panel according to claim 5, wherein the compensation electrode portions comprise first compensation electrode portions and second compensation electrode portions which are insulated from the first compensation electrode portions;

wherein in the display region, the first compensation electrode portions, the common electrode portions, and the second compensation electrode portions are alternately disposed side by side along the first direction, and one of the first compensation electrode portions or one of the second compensation electrode portions exists between two adjacent common electrode portions of the common electrode portions.

8. The display panel according to claim 7, further comprising a non-display region, wherein the first compensation electrode portions are electrically connected in the non-display region, the second compensation electrode portions are electrically connected in the non-display region, and the common electrode portions are electrically connected in the non-display region.

9. The display panel according to claim 7, further comprising a non-display region, wherein at least one of:

the first compensation electrode portions are insulated from each other in the non-display region; or the second compensation electrode portions are insulated from each other in the non-display region; and wherein the common electrode portions are electrically connected in the non-display region.

10. The display panel according to claim 1, further comprising a plurality of light-emitting units arranged in an array;

wherein the common electrode portion is disposed in a spiral shape, and along an extension direction of the common electrode portion, the common electrode portion is electrically connected to the plurality of light-emitting units in sequence; and the compensation electrode portion is disposed in a spiral shape and disposed side by side with the common electrode portion.

11. The display panel according to claim 1, further comprising a plurality of light-emitting units arranged in an array;

wherein the common electrode portion is disposed in a shape of a polyline, and along an extension direction of the common electrode portion, the common electrode portion is electrically connected to the plurality of light-emitting units in sequence; and the compensation electrode portion is disposed in a shape of a comb and comprises a plurality of tooth sub-portions and a main sub-portion connecting the plurality of tooth sub-portions, wherein a tooth sub-portion of the plurality of tooth sub-portions is inserted between two adjacent polyline segments of the common electrode portion.

12. The display panel according to claim 11, comprising a scan signal line and a data signal line, wherein an extension direction of the scan signal line intersects with an extension direction of the data signal line; and wherein an extension direction of the tooth sub-portion is parallel to the extension direction of the scan signal line, and an extension direction of the main sub-portion is parallel to the extension direction of the data signal line; or an extension direction of the tooth sub-portion is parallel to the extension direction of the data signal line, and an extension direction of the main sub-portion is parallel to the extension direction of the scan signal line.

13. The display panel according to claim 11, comprising a scan signal line and a data signal line, wherein an extension direction of the scan signal line intersects with an extension direction of the data signal line;

wherein an extension direction of the tooth sub-portion intersects with each of the extension direction of the scan signal line and the extension direction of the data signal line, and the main sub-portion comprises a first branch and a second branch and an extension direction of the first branch intersects with an extension direction of the second branch.

14. The display panel according to claim 6, wherein each of the plurality of light-emitting units comprises at least one light-emitting device, and a light-emitting device of the at least one light-emitting device is at least partially disposed in a respective pixel opening.

15. The display panel according to claim 10, wherein each of the plurality of light-emitting units comprises at least one light-emitting device, and a light-emitting device of the at least one light-emitting device is at least partially disposed in a respective pixel opening.

16. A display panel control method, applied to the display panel according to claim 1, comprising:

acquiring a current touch sensing signal, and calculating a signal-to-noise ratio according to the current touch sensing signal;

acquiring a current transmission signal of a first display signal line in response to the signal-to-noise ratio being less than a signal-to-noise ratio threshold; and calculating a current compensation signal according to the current transmission signal, and applying the current compensation signal to a compensation electrode portion.

17. The control method according to claim 16, wherein calculating the current compensation signal according to the current transmission signal comprises:

determining a first voltage variation amount of the current transmission signal;

calculating a second voltage variation amount of a compensation signal according to the first voltage variation amount, wherein the second voltage variation amount is proportional to an opposite number of the first voltage variation amount; and calculating the current compensation signal according to a base signal of the compensation signal and the second voltage variation amount.

18. The control method according to claim 17, wherein the display panel comprises a plurality of first display signal lines, and the first voltage variation amount is a maximum value among acquired voltage variation amounts of current transmission signals of all of the plurality of first display signal lines.

19. The control method according to claim 16, wherein the first display signal line comprises a scan signal line and a data signal line, and the compensation electrode portion comprises a first compensation electrode portion and a second compensation electrode portion which are insulated from the first compensation electrode portion;

wherein calculating the current compensation signal according to the current transmission signal, and applying the current compensation signal to the compensation electrode portion comprises:

calculating a current first compensation signal according to a current transmission signal of the scan signal line, and applying the current first compensation signal to the first compensation electrode portion; and calculating a current second compensation signal according to a current transmission signal of the data signal line, and applying the current second compensation signal to the second compensation electrode portion.

20. The control method according to claim 16, wherein acquiring the current transmission signal of the first display signal line comprises:

acquiring a current transmission signal of the first display signal line once every first period;

wherein the first period refers to a display driving period of one row of pixels.

* * * * *